(12) United States Patent
Ishigami et al.

(10) Patent No.: US 7,684,922 B2
(45) Date of Patent: Mar. 23, 2010

(54) VARIABLE VALVE SYSTEM, AND ENGINE SYSTEM AND VEHICLE INCLUDING THE SAME

(75) Inventors: Hidetoshi Ishigami, Shizuoka (JP); Yoshitaka Nagai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 118 days.

(21) Appl. No.: 12/094,008

(22) PCT Filed: Nov. 30, 2006

(86) PCT No.: PCT/JP2006/323982

§ 371 (c)(1), (2), (4) Date: Jun. 9, 2008

(87) PCT Pub. No.: WO2007/069467

PCT Pub. Date: Jun. 21, 2007

(65) Prior Publication Data
US 2009/0240420 A1 Sep. 24, 2009

(30) Foreign Application Priority Data
Dec. 13, 2005 (JP) .............................. 2005-359363

(51) Int. Cl.
*F01L 1/04* (2006.01)
*F02D 41/30* (2006.01)

(52) U.S. Cl. .................... 701/103; 701/110; 123/90.17; 123/436; 123/406.58; 73/114.25

(58) Field of Classification Search ................. 123/350, 123/399, 90.16, 90.17, 436, 406.19, 406.58; 701/103, 110; 73/114.25
See application file for complete search history.

(56) References Cited

U.S. PATENT DOCUMENTS 4,577,592 A  3/1986  Bosch et al.

(Continued)

FOREIGN PATENT DOCUMENTS

DE          33 26 096 A1   1/1985

(Continued)

OTHER PUBLICATIONS

Official communication issued in the International Application No. PCT/JP2006/323982, mailed on Feb. 20, 2007.

(Continued)

*Primary Examiner*—Hai H Huynh
(74) *Attorney, Agent, or Firm*—Keating & Bennett, LLP

(57) ABSTRACT

A cam sensor is provided in a position opposing one surface side of a cam driven sprocket in a valve timing control device. When the valve timing control device is in a high revolution state, a weight is pivoted by centrifugal force caused by the rotation. This allows a projection at the weight to be detected by the cam sensor. In this case, for each rotation of the valve timing control device, the projection of the weight passes the detectable position of the cam sensor and a pulse is generated in a cam signal to be transmitted from the cam sensor to an ECU.

12 Claims, 18 Drawing Sheets

U.S. PATENT DOCUMENTS

| | | | |
|---|---|---|---|
| 4,996,954 A | 3/1991 | Seki et al. | |
| 5,009,203 A | 4/1991 | Seki | |
| 5,179,918 A | 1/1993 | Gyurovits | |
| 5,181,486 A | 1/1993 | Gyurovits | |
| 5,609,127 A | 3/1997 | Noplis | |
| 6,289,860 B1 | 9/2001 | Speckhart et al. | |
| 7,222,593 B2 * | 5/2007 | Stork et al. | 123/90.15 |
| 7,451,730 B2 * | 11/2008 | Nguyen et al. | 123/90.17 |
| 2003/0000498 A1 * | 1/2003 | Mathews et al. | 123/406.62 |
| 2007/0295295 A1 * | 12/2007 | Kobayashi et al. | 123/90.17 |
| 2009/0114175 A1 * | 5/2009 | Yamamoto et al. | 123/90.17 |
| 2009/0272348 A1 * | 11/2009 | Yamamoto et al. | 123/90.17 |

FOREIGN PATENT DOCUMENTS

| | | |
|---|---|---|
| GB | 2 263 152 A | 7/1993 |
| JP | 55-081213 A | 6/1980 |
| JP | 56-2004 U | 1/1981 |
| JP | 60-8402 U | 1/1985 |
| JP | 60-147512 A | 8/1985 |
| JP | 1-157208 U | 10/1989 |
| JP | 01-300007 A | 12/1989 |
| JP | 01-300008 A | 12/1989 |
| JP | 08-28313 A | 1/1996 |
| JP | 09-324614 A | 12/1997 |
| JP | 2002-13005 A | 5/2002 |

OTHER PUBLICATIONS

Official Communication issued in corresponding European Patent Application No. 06833785.6, mailed on Nov. 26, 2009.

* cited by examiner

VARIABLE VALVE SYSTEM, AND ENGINE SYSTEM AND VEHICLE INCLUDING THE SAME

BACKGROUND OF THE INVENTION

1. Field of the Invention

The present invention relates to a variable valve system, and an engine system and a vehicle including the same.

2. Description of the Background Art

Conventionally, many kinds of variable valve timing (VVT) mechanisms that control the opening/closing timing of an intake valve or an exhaust valve have been developed in order to improve fuel consumption, reduce toxic substances in exhaust gas, and achieve high power output in a particular revolution range.

Some of those variable valve timing mechanisms use an actuator such as a hydraulic cylinder and an electric motor, for example. However, these actuators are expensive and the use of such an actuator increases the size of the variable valve timing mechanism.

In general, the space occupied by an engine in a motorcycle is smaller than that of a four-wheeled automobile and the like. There has been a demand for motorcycles that can be manufactured less costly. Therefore, there is a demand for more inexpensive and compact variable valve timing mechanisms for use in motorcycles. Thus, it was difficult to use the variable valve timing mechanisms including actuators as described above in motorcycles.

A rotation phase generator has been suggested as a variable valve timing mechanism that can be made compact (see JP 9-324614 A).

In the rotation phase generator, an input member including two intermediate members is rotated together with the revolution of the engine. When centrifugal force acting on a weight portion of the two intermediate members is greater than the energizing force of a coil spring connecting these intermediate members, the rotation phases of the input member and an output member connected to a camshaft change, so that the valve timing changes.

With the rotation phase generator, the valve timing is controlled depending on the mechanical arrangement, and therefore the cost and size can be reduced.

In the above-described variable valve timing mechanism, an ECU (Electronic Control Unit) does not switch the valve timing but the valve timing is mechanically switched at a prescribed revolution speed of the engine by centrifugal force generated by the revolution of the engine. The ECU determines the valve timing based on the revolution speed of the engine and controls the fuel injection amount, the fuel injection timing, and the spark ignition timing. In practice, however, the revolution speed of the engine at which the valve timing switches varies.

In this case, the ECU cannot accurately determine the actual valve timing during driving. Therefore, control of the fuel injection amount, the fuel injection timing, and the spark ignition timing carried out by the ECU could be inconsistent with actual valve timing in some cases. This gives rise to problems such as increase in toxic substances in exhaust gas.

SUMMARY OF THE INVENTION

In order to overcome the problems described above, preferred embodiments of the present invention provide a variable valve system that can accurately determine changes in the state of a cam member while switching the valve timing by switching the state of the cam member with a mechanical arrangement, and an engine system and a vehicle including the same.

(1) A variable valve system according one aspect of the invention controls the opening/closing of a valve in response to the revolution speed of an engine and includes a rotation member provided to be rotatable in response to the revolution of the engine, a cam member provided in abutment against the valve and switchable between a first state in a first positional relation and a second state in a second positional relation relative to the rotation member, a moving member having a first detection portion and allowed to move by centrifugal force caused by the rotation of the rotation member so that the cam member is switched from the first state to the second state, and a detector provided to be capable of detecting the first detection portion rotating together with the rotation member when the moving member is in a first position corresponding to the first state or a second position corresponding to the second state.

In the variable valve system, the rotation member rotates in response to the revolution of the engine, and the cam member rotates together with the rotation member. In this way, the valve in abutment against the cam member is opened/closed.

The cam member can switch between a first state in a first positional relation and a second state in a second positional relation relative to the rotation member. In this way, the opening/closing timing of the valve driven by the cam member is switched.

As the revolution speed of the engine increases, the moving member is allowed to move from the first position to the second position by centrifugal force caused by the rotation of the rotation member. In this way, the cam member is switched from the first state to the second state.

Furthermore, the moving member rotates in the first position or the second position together with the rotation member, so that the first detection portion of the moving member can be detected by the detector.

In this case, the first detection portion is detected by the detector when the moving member is in one of the first and second positions. In this way, whether the moving member is in the first position or the second position can be determined based on whether the first detection portion is detected by the detector, so that it can be determined whether the cam member is in the first state or the second state. Therefore, the opening/closing timing of the valve by the cam member can accurately be determined.

(2) The variable valve system may further include a second detection portion that rotates together with the rotation member, wherein the second detection portion may be provided in such a position that the second detection portion rotating is detected by the detector when rotating together with the rotation member.

In this case, the second detection portion can be detected by the detector whether the cam member is in the first state or the second state when the second detection portion rotates together with the rotation member. The cycle of detection of the second detection portion by the detector corresponds to the cycle of the rotation of the rotation member, and therefore the operation of the engine can be controlled based on the cycle of the rotation of the rotation member.

The first and second detection portions can be detected by a common detector. In this way, it is not necessary to provide a plurality of detectors separately, so that the variable valve system can be reduced in size and the manufacturing cost can be prevented from being increased.

(3) The detector may be provided in such a position that the detector can detect the first and second detection portions in a direction parallel to the rotation axis of the rotation member.

In this case, the first and second detection portions are detected by a common detector in a direction parallel to the rotation axis of the rotation member. In this way, the variable valve system can be reduced in size and this can provide improved design flexibility in the direction orthogonal to the rotation axis of the rotation member.

(4) The detector may be provided in such a position that the detector can detect the first and second detection portions in a direction orthogonal to the rotation axis of the rotation member.

In this case, the first and second detection portions are detected by a common detector in a direction orthogonal to the rotation axis of the rotation member. In this way, the variable valve system can be reduced in size and this can provide improved design flexibility in the direction parallel to the rotation axis of the rotation member.

(5) The length of the first detection portion in the rotation direction and the length of the second detection portion in the rotation direction may be different.

In this way, the detection period of the first detection portion by the detector and the detection period of the second detection portion by the detector are different. Therefore, based on the difference between the periods during which the detector detects the objects, the first and second detection portions may easily be identified.

(6) An engine system according to another aspect of the invention includes an engine having a valve, a variable valve system that controls the opening/closing of the valve in response to the revolution speed of the engine, and a controller that controls the engine, the variable valve system includes a rotation member provided to be rotatable in response to the revolution of the engine, a cam member provided in abutment against the valve and switchable between a first state in a first positional relation and a second state in a second positional relation relative to the rotation member, a moving member having a first detection portion and allowed to move by centrifugal force caused by the rotation of the rotation member so that the cam member is switched from the first state to the second state, and a detector provided to be capable of detecting the first detection portion rotating together with the rotation member when the moving member is in a first position corresponding to the first state or a second position corresponding to the second state, and the controller determines whether the cam member is in the first state or the second state based on the output signal of the detector and controls the operation of the engine based on the result of determination.

In the engine system, the valve of the engine is driven by the variable valve system.

In the variable valve system, the rotation member rotates in response to the revolution of the engine, and the cam member rotates together with the rotation member. In this way, the valve in abutment against the cam member is opened/closed.

The cam member can switch between a first state in a first positional relation and a second state in a second positional relation relative to the rotation member. In this way, the opening/closing timing of the valve driven by the cam member is switched.

When the revolution speed of the engine increases, the moving member is allowed to move from the first position to the second position by centrifugal force caused by the rotation of the rotation member. In this way, the cam member is switched from the first state to the second state.

Furthermore, when the moving member rotates in the first position or the second position together with the rotation member, the first detection portion of the moving member can be detected by the detector.

The detector applies the result of detection of the first detection portion to the controller as an output signal. The controller determines whether the cam member is in the first state or the second state based on the output signal of the detector. The controller controls the operation of the engine based on the result of determination.

In this way, the controller can accurately determine the opening/closing timing of the valve by the cam member by determining whether the cam member is in the first state or the second state based on the output signal of the detector. Therefore, the controller can control the operation of the engine to be optimum in response to the opening/closing timing of the valve.

(7) The variable valve system may further include a second detection portion that rotates together with the rotation member, wherein the second detection portion may be provided in such a position that the second detection portion is detected by the detector when rotating together with the rotation member.

In this case, the second detection portion can be detected by the detector whether the cam member is in the first state or the second state when the second detection portion rotates together with the rotation member. The cycle of detection of the second detection portion by the detector corresponds to the cycle of the rotation of the rotation member and therefore the controller can control the engine based on the cycle of the rotation of the rotation member.

The first and second detection portions can be detected by a common detector. In this way, it is not necessary to provide a plurality of detectors separately, so that the variable valve system can be reduced in size and the manufacturing cost can be prevented from being increased. Consequently, the engine can be reduced in size and manufactured less costly.

(8) The length of the first detection portion in the rotation direction and the length of the second detection portion in the rotation direction may be different.

In this case, the detection period of the first detection portion by the detector and the detection period of the second detection portion by the detector are different. Therefore, based on the difference between the periods during which the detector detects the objects, the first and second detection portions may easily be identified.

(9) The controller may determine whether the first detection portion is detected based on the detection period of the first or second detection portion by the detector.

In this case, The length of the first detection portion in the rotation direction and the length of the second detection portion in the rotation direction are different, so that the detection period of the first detection portion by the detector and the detection period of the second detection portion by the detector are different. Therefore, the controller can easily identify the detection of the first detection portion by the detector and the detection of the second detection by the detector.

(10) The controller may determine whether or not the first detection portion is detected based on the number of detection by the detector for one rotation period of the rotation member.

In this case, the second detection portion is detected for each rotation of the rotation member. Meanwhile, the first detection portion is detected when the moving member is in one of the first position and the second position.

Therefore, based on the number of detection by the detector for one rotation period of the rotation member, the controller can determine whether the first detection portion has been detected. In this way, the controller can determine whether the cam member is in the first state or the second state.

(11) The controller may determine whether the cam member is in the first state or the second state based on the output signal of the detector and controls at least one of a fuel injection amount, fuel injection timing, and spark ignition timing in the engine based on the result of determination.

In this way, the controller can accurately determine the opening/closing timing of the valve by the cam member. Therefore, the controller can control the fuel injection amount, the fuel injection timing or the spark ignition timing to be optimum in response to the opening/closing timing of the valve. Consequently, toxic substances in exhaust gas can be reduced.

(12) A vehicle according to yet another aspect of the invention includes an engine system, and a driving member driven by motive power generated by the engine system, the engine system includes an engine having a valve, a variable valve system that controls the opening/closing of the valve in response to the revolution speed of the engine, and a controller that controls the engine, the variable valve system includes a rotation member provided to be rotatable in response to the revolution of the engine, a cam member provided in abutment against the valve and switchable between a first state in a first positional relation and a second state in a second positional relation relative to the rotation member, a moving member having a first detection portion and allowed to move by centrifugal force caused by the rotation of the rotation member so that the cam member is switched from the first state to the second state, and a detector provided to be capable of detecting the first detection portion rotating together with the rotation member when the moving member is in a first position corresponding to the first state or a second position corresponding to the second state, and the controller determines whether the cam member is in the first state or the second state based on the output signal of the detector and controls the operation of the engine based on the result of determination.

In the vehicle, the driving member is driven by motive power generated by the engine system.

In this way, in the engine system, the controller can accurately determine whether the cam member is in the first state or the second state based on the output signal of the detector. Therefore, the opening/closing timing of the valve by the cam member can accurately be determined.

Therefore, the controller can control the operation of the engine to be optimum in response to the opening/closing timing of the valve.

According to the invention, when the moving member is in one of the first position and the second position, the first detection portion is detected by the detector. In this way, it can be determined whether the moving member is in the first position or the second position, so that it can be determined whether the cam member is in the first state or the second state. Therefore, the opening/closing timing of the valve by the cam member can accurately be determined.

Other features, elements, steps, characteristics, and advantages of the present invention will become more apparent from the following description of preferred embodiments of the present invention with reference to the attached drawings.

DETAILED DESCRIPTION OF THE PREFERRED EMBODIMENTS

Now, a variable valve system, and an engine system and a vehicle including the same according to one embodiment of the invention will be described. In the embodiment, a small size motorcycle will be described as the vehicle.

(1) Structure of Vehicle

Figure 1:
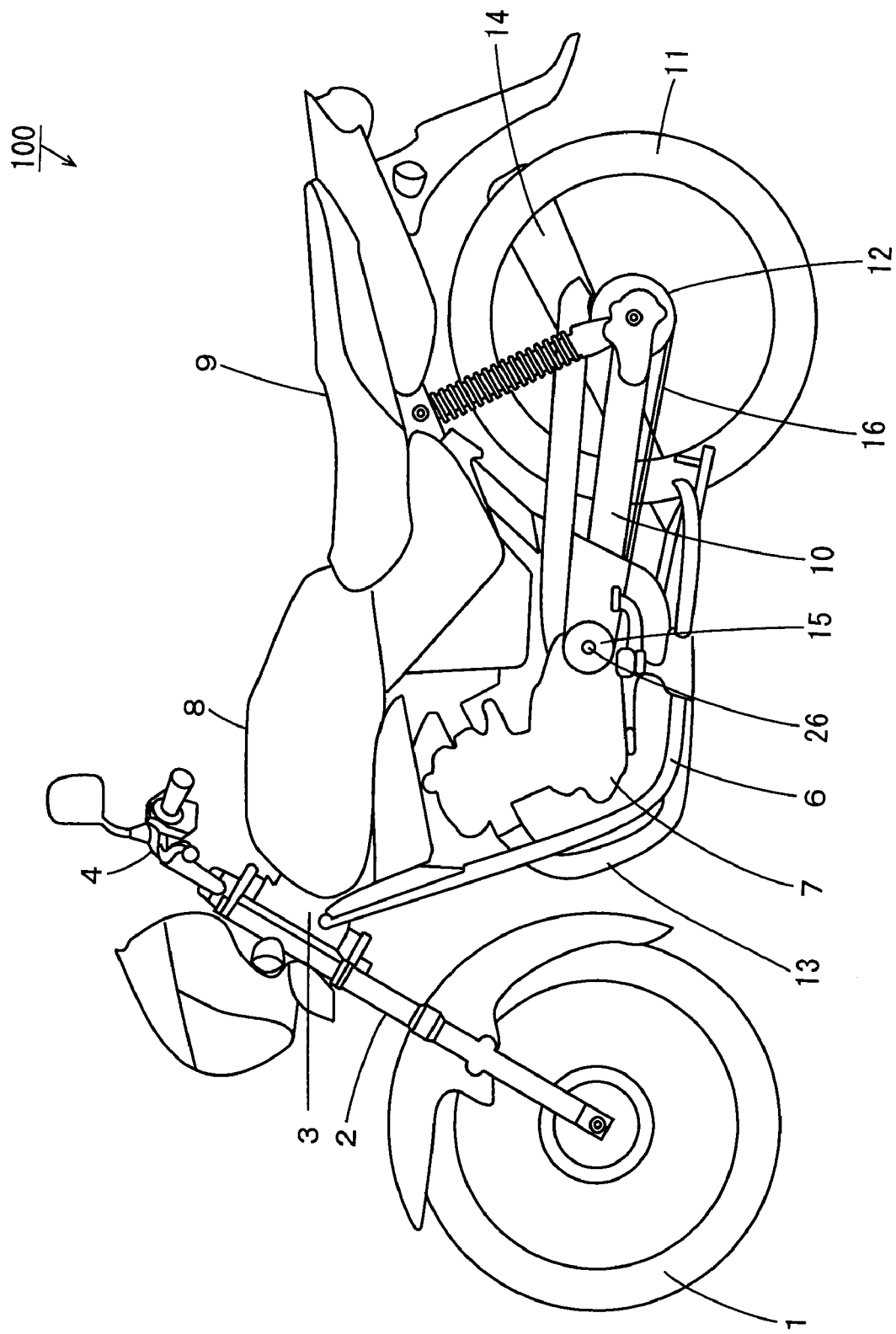
FIG. 1 is a schematic view of a motorcycle according to one embodiment of the invention.

FIG. 1 is a schematic view of a motorcycle according to the embodiment of the invention.

In the motorcycle 100, a head pipe 3 is provided at the front end of a main body frame 6. A front fork 2 provided at the head pipe 3 can swing from side to side. At the lower end of the front fork 2, the front wheel 1 is rotatably supported. A handle 4 is attached to the upper end of the head pipe 3.

An engine 7 is held in the center of the main body frame 6. A fuel tank 8 is provided above the engine 7, and a seat 9 is provided behind the fuel tank 8.

A rear arm 10 is connected to the main body frame 6 to extend behind the engine 7. The rear arm 10 holds the rear wheel 11 and a rear wheel driven sprocket 12 in a rotatable manner. A muffler 14 is attached to the rear end of an exhaust pipe 13 connected to the engine 7.

A rear wheel drive sprocket 15 is attached to the drive shaft 26 of the engine 7. The rear wheel drive sprocket 15 is coupled to the rear wheel driven sprocket 12 of the rear wheel 11 through a chain 16.

The engine 7 includes a variable valve system. Now, the variable valve system according to the embodiment will be described.

(2) General Structure of Variable Valve System

Figure 2:
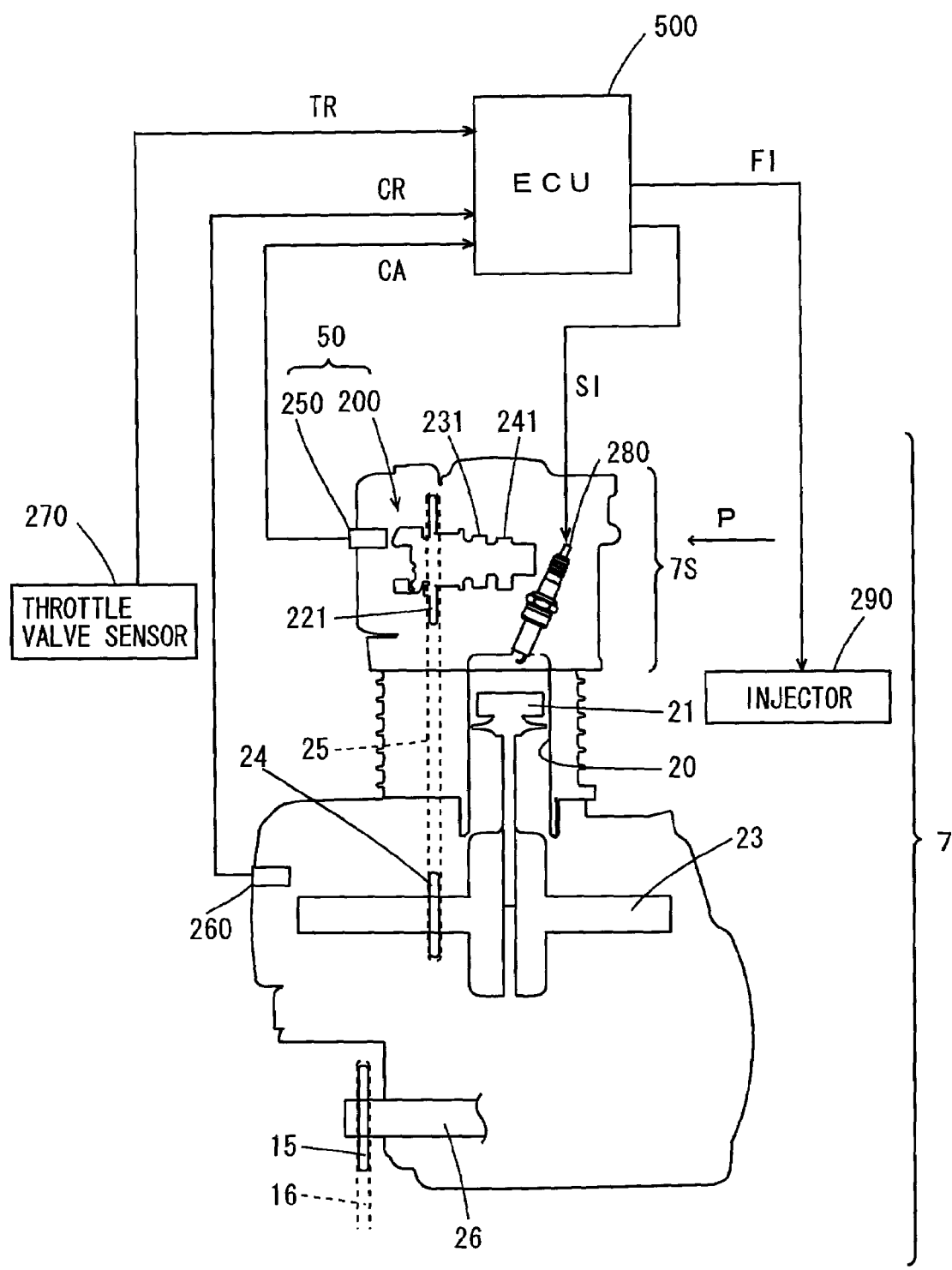
FIG. 2 is a view for use in illustrating the general structure of a variable valve system according to the embodiment of the invention.

FIG. 2 is a schematic view of the general structure of the variable valve system according to the embodiment of the invention.

As shown in FIG. 2, the variable valve system 50 includes a valve timing control device 200 and a cam sensor 250. The valve timing control device 200 is provided at a cylinder head 7S and includes a cam driven sprocket 221, an intake cam 231, and an exhaust cam 241.

As a piston 21 reciprocates in the cylinder 20, a crankshaft 23 rotates, and a cam drive sprocket 24 provided at the crankshaft 23 rotates.

The turning force of the cam drive sprocket 24 is transmitted to the cam driven sprocket 221 of the valve timing control device 200 through a chain 25. In this way, the valve timing control device 200 rotates.

In the valve timing control device 200, the phase relation between the intake cam 231 and the exhaust cam 241 changes in response to the revolution speed of the engine 7 and changes in the revolution speed (rise and fall in the revolution speed). This changes the valve timing.

A crank sensor 260 is provided in the vicinity of the crankshaft 23. The crank sensor 260 applies information about the rotation of the crankshaft 23 as a crank signal CR to an ECU (Electronic Control Unit) 500. The crank sensor 260 and the crank signal CR will later be described in detail.

In the cylinder head 7S, the cam sensor 250 is provided in the vicinity of the valve timing control device 200. The cam sensor 250 applies information about the operation of the valve timing control device 200 as a cam signal CA to the ECU 500. The cam sensor 250 and the cam signal CA will later be described in detail.

The opening of the throttle valve (not shown) (hereinafter referred to as "throttle opening TR") provided in the engine 7 is detected by a throttle valve sensor 270. The throttle opening TR detected by the throttle valve sensor 270 is applied to the ECU 500.

From the ECU 500, a spark ignition signal SI is applied to an ignition plug 280 provided at the top of the cylinder head 7S and a fuel injection signal FI is applied to an injector 290 provided in the engine 7. In this way, the spark ignition timing by the ignition plug 280 and the fuel injection amount and the fuel injection timing by the injector 290 are controlled.

(3) Structure of Valve Timing Control Device

Figure 3:
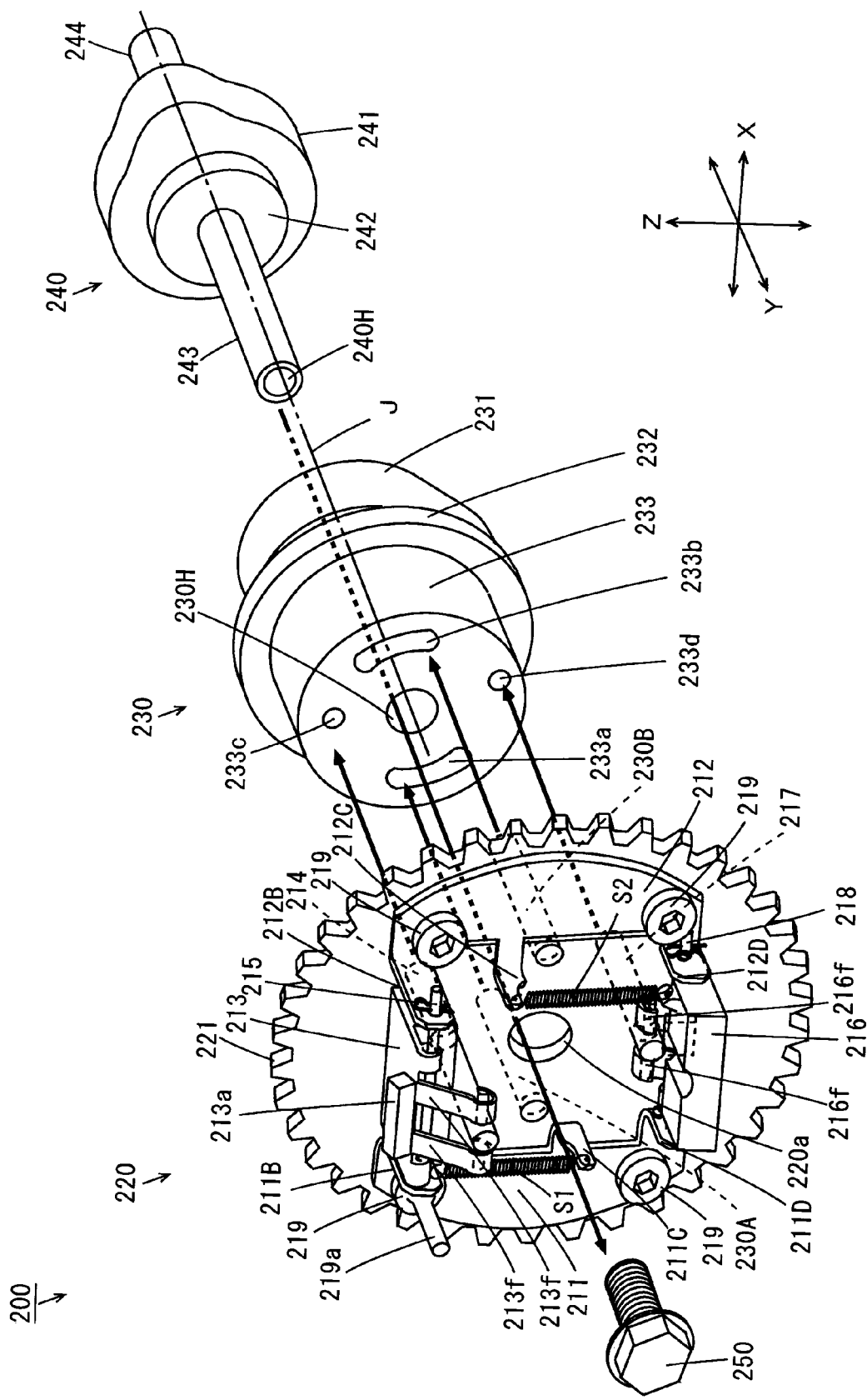
FIG. 3 is a perspective view for use in illustrating how a valve timing control device is assembled.

Now, the structure of the valve timing control device 200 shown in FIG. 2 will be described in detail. FIG. 3 is a perspective view showing how the valve timing control device 200 is assembled. In FIG. 3, the three directions orthogonal to one another as indicated by the arrows X, Y, and Z are defined as the X-, Y-, and Z-directions, respectively.

The valve timing control device 200 mainly includes a cam driven sprocket portion 220, an intake camshaft 230, and an exhaust camshaft 240.

The cam driven sprocket portion 220 has the cam driven sprocket 221 parallel to the XZ plane. A through hole 220a is formed in the center of the cam driven sprocket 221. The cam driven sprocket 221 has two plate shaped supporters 211 and 212 attached at a prescribed interval by two screws at its one surface. A projection 219a extending in the Y-direction is provided at the head of one of the screws 219 attached to the supporter 211, details of which will later be described.

The supporter 211 has projections 211B and 211D extending in the Y-direction in its upper part and lower part, and the supporter 212 has projections 212B and 212D extending in the Y-direction in its upper part and lower part. A spring holding member 211C extending in the Y-direction is formed between the projections 211B and 211D, and a spring holding member 212C extending in the Y-direction is formed between the projections 212B and 212D. The projections 211B, 211D, 212B, and 212D and the spring holding members 211C, 212C have through holes formed therethrough.

A substantially rectangular parallelepiped weight 213 is provided between the projections 211B and 212B. The weight 213 is pivotably held by a pivot shaft 215 inserted through the through holes in the projections 211B and 212B. Two hooks 213f are formed to extend obliquely downwardly from the end of the upper surface of the weight 213. The tip end of each of the hooks 213f has a semi-cylindrical shape. A substantially rectangular parallelepiped projection 213a slanted in the Y-direction is formed along the X-direction at the top surface of the weight 213. The projection 213a will later be described in detail.

A substantially rectangular parallelepiped weight 216 is provided between the projections 211D and 212D. The weight 216 is pivotably held by a pivot shaft 218 inserted through the through holes in the projections 211D and 212D. The weight 216 has a shape substantially identical to the shape of the weight 213 and has hooks 216f corresponding to the hooks 213f. The weight 216 however does not have a part corresponding to the projection 213a. The weights 213 and 216 are in substantially symmetric positions with each other with respect to an axis parallel to the X-direction.

A high speed lock pin 214 is provided through the cam driven sprocket 221 under the weight 213. The lock pin 214 is held between the hooks 213f formed at the weight 213. Similarly, a low speed lock pin 217 is provided above the weight 216. The low speed lock pin 217 is held between the hooks 216f formed at the weight 216.

Note that the high speed lock pin 214 and the low speed lock pin 217 can slide in the Y-direction with respect to the cam driven sprocket 221. In the state shown in FIG. 3, the tip end of the low speed lock pin 217 protrudes in the Y-direction ahead of the tip end of the high speed lock pin 214 on the other surface side of the cam driven sprocket portion 220.

A spring S1 has one end engaged through the through hole provided at the projection (not shown) of the weight 213 and its other end engaged through the through hole of the spring holding member 211C. A spring S2 has one end engaged through the through hole of the projection (not shown) of the weight 216 and its other end engaged through the through hole of the spring holding member 212C.

At one surface of the cam driven sprocket 221, a projection 220T (that will be described in conjunction with FIG. 5) is formed between the cam driven sprocket 221 and the weight 216.

Two fixing pins 230A and 230B are provided to extend in the Y-direction from the other surface side of the cam driven sprocket 221. The fixing pins 230A and 230B are connected to the cam driven sprocket 221 on both sides of the through hole 220a.

The intake camshaft 230 and the exhaust camshaft 240 are provided to have their axial center J arranged parallel to the Y-direction on the other surface side of the cam driven sprocket 221.

The intake camshaft 230 includes the intake cam 231, a stepped portion 232, and a pivot shaft 233.

The intake camshaft 230 has the cylindrical pivot shaft 233 on its one end side, the stepped portion 232 having a diameter slightly larger than that of the pivot shaft 233 in its center, and the intake cam 231 on its other end side.

A pivot through hole 230H is formed to extend from the center of the end of the pivot shaft 233 to the center of the end of the intake cam 231 in the Y-direction. More specifically, the pivot through hole 230H is formed from one end to the other end of the intake camshaft 230 in the Y-direction.

A high speed pin introduction hole 233c, a low speed pin introduction hole 233d, and two floating grooves 233a and 233b are formed on a circle around the axial center J on the end of the pivot shaft 233.

The high speed pin introduction hole 233c and the low speed pin introduction hole 233d are formed to substantially oppose each other through the pivot through hole 230H. More specifically, the high speed lock pin 214 and the low speed lock pin 217 are provided in positions an angle of 180° apart from each other around the axial center J. Meanwhile, the high speed pin introduction hole 233c and the low speed pin introduction hole 233d are a prescribed angle shifted in the circumferential direction from the positions 180° apart from each other around the axial center J.

The pin floating grooves 233a and 233b are formed to extend in the circumferential direction around the axial center J and oppose each other through the pivot through hole 230H.

The exhaust camshaft 240 has a cam fixing shaft 243 extending in the Y-direction on its one end side, a stepped portion 242 and the exhaust cam 241 in the center, and a projection shaft 244 extending in the Y-direction on its other end side. A sprocket screw hole 240H is formed at an end of the cam fixing shaft 243.

During assembly of the cam driven sprocket portion 220, the intake camshaft 230, and the exhaust camshaft 240, the intake camshaft 230 and the exhaust camshaft 240 are attached to the other surface side of the cam driven sprocket 221.

More specifically, the cam fixing shaft 243 of the exhaust camshaft 240 is inserted into the pivot through hole 230H of the intake camshaft 230. In this way, the exhaust camshaft 240 holds the intake camshaft 230 in a rotatable manner. One end of the cam fixing shaft 243 of the exhaust camshaft 240 is inserted into the through hole 220a from the other surface side of the cam driven sprocket 221.

In this state, a sprocket screw 250 is inserted into the sprocket screw hole 240H of the cam fixing shaft 243 from one surface side of the cam driven sprocket 221. In this way, the exhaust camshaft 240 is fixed to the cam driven sprocket 221.

Note that the exhaust cam 241, the stepped portion 242, the cam fixing shaft 243 and the projection shaft 244 of the exhaust camshaft 240 may be formed integrally or discretely. The intake cam 231, the stepped portion 232 and the pivot shaft 233 of the intake camshaft 230 may be formed integrally or discretely.

(4) Operation of Valve Timing Control Device

Figure 4:
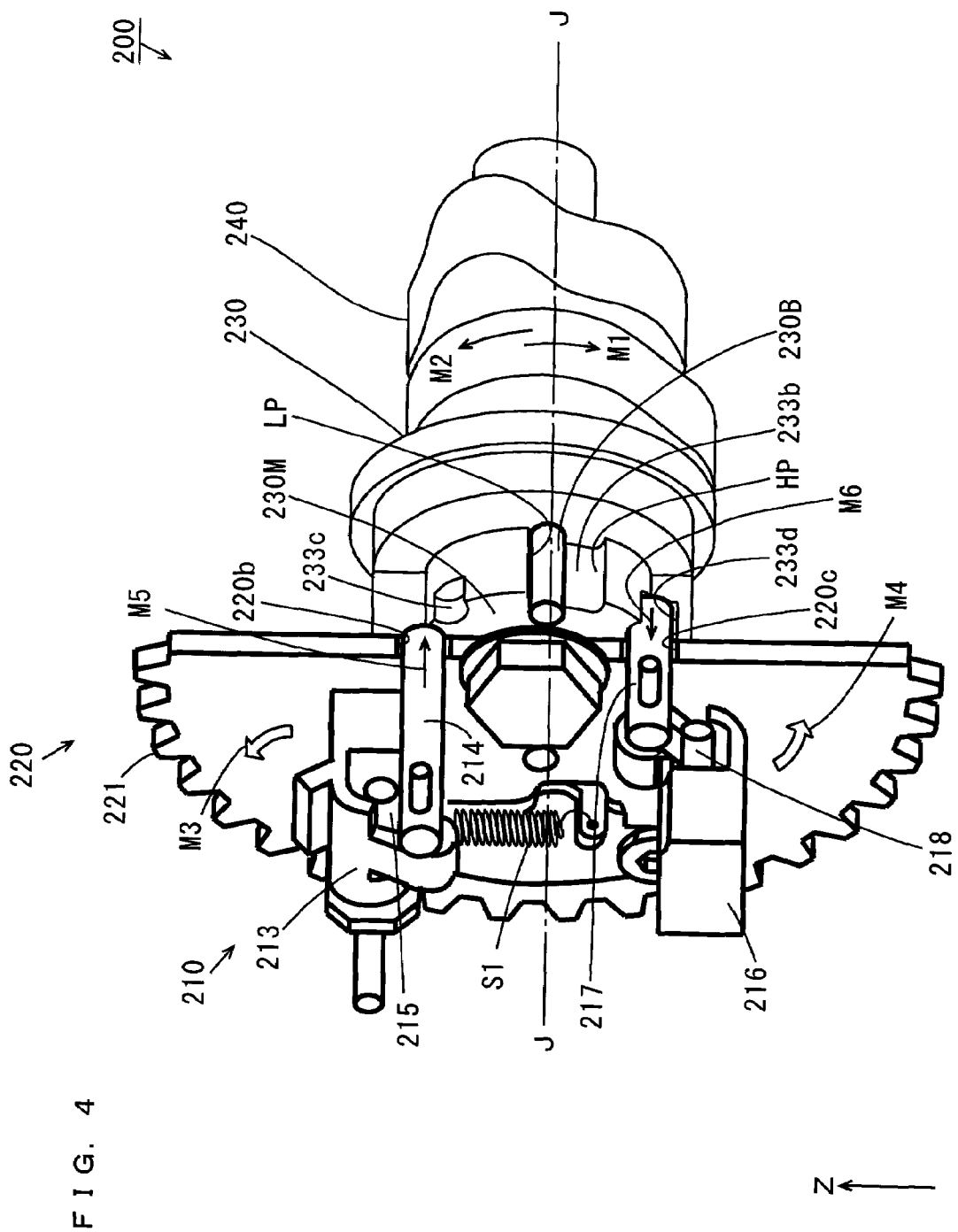
FIG. 4 is a cutaway perspective view for use in illustrating the operation of the valve timing control device.
Figure 5:
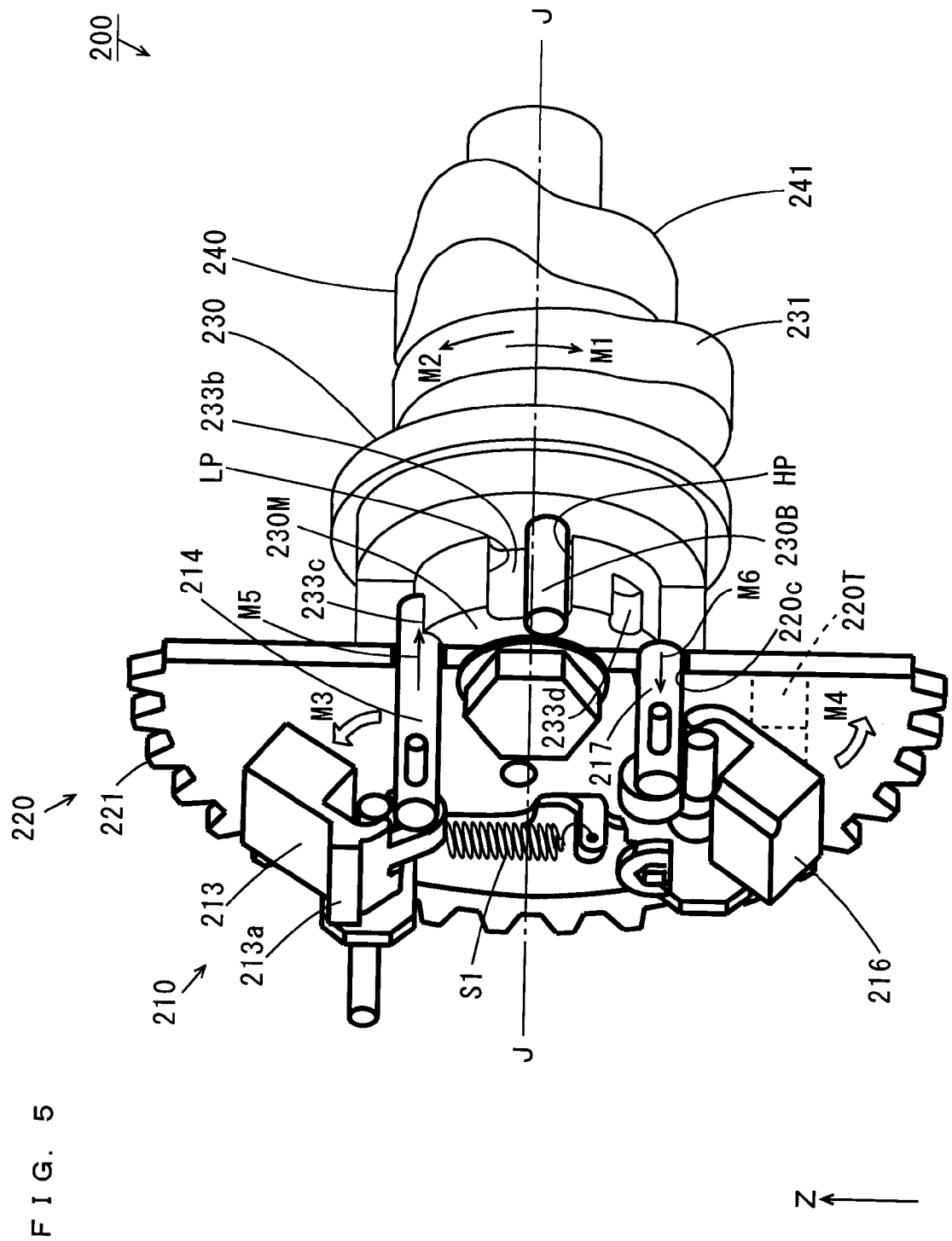
FIG. 5 is a cutaway perspective view for use in illustrating the operation of the valve timing control device.

FIGS. 4 and 5 are cutaway perspective views for use in illustrating the operation of the valve timing control device 200. In FIGS. 4 and 5, in the valve timing control device 200, the cam driven sprocket portion 220 and the intake camshaft 230 are shown as they are partly cut away.

In FIGS. 4 and 5, the direction denoted by the arrow Z is defined as the Z-direction. Note that a direction directed by an arrow is defined as "+" direction, while its opposite direction is defined as "−" direction. The dash-dotted line in these figures denotes the axial center J of the valve timing control device 200.

FIG. 4 shows the valve timing control device 200 in a completely assembled state. FIG. 5 shows the state of the valve timing control device 200 during a high revolution period for the engine 7 (the state in which the revolution speed of the engine 7 is high).

In FIG. 4, the cam driven sprocket portion 220 has a part cut away from the center in the Z-direction. As shown in FIG. 3, the fixing pin 230B is connected to the cam driven sprocket 221 in practice.

As shown in FIG. 4, when assembly of the valve timing control device 200 is complete, the weight 213 is energized in the -Z-direction by the spring S1. The weight 213 holds the high speed lock pin 214 inserted in the through hole 220b in the cam driven sprocket 221. In this way, the rotation of the weight 213 around the pivot shaft 215 is restricted.

Meanwhile, the weight 216 is energized in the +Z-direction by the spring S2 that is not shown (see FIG. 3). The weight 216 holds the low speed lock pin 217 inserted in the through hole 220c in the cam driven sprocket 221. In this way, the rotation of the weight 216 around the pivot shaft 218 is restricted.

In FIG. 4, one end of the high speed lock pin 214 inserted in the cam driven sprocket 221 substantially abuts against a contact surface 230M orthogonal to the axial center J of the intake camshaft 230.

Meanwhile, the low speed lock pin 217 is inserted in the low speed pin introduction hole 233d of the intake camshaft 230. One end of the low speed lock pin 217 inserted in the low speed pin introduction hole 233d substantially abuts against the bottom surface of the low speed pin introduction hole 233d.

As described above, the pin floating groove 233b extends in the circumferential direction around the axial center J. Here, one end of the pin floating groove 233b in the circumferential direction will be referred to as "low speed groove end LP" and the other end of the pin floating groove 233b in the circumferential direction will be referred to as "high speed groove end HP."

In FIG. 4, the fixing pin 230B inserted in the pin floating groove 233b is positioned at the low speed groove end LP. The fixing pin 230B is fixed to the cam driven sprocket 221, and therefore the rotation of the intake camshaft 230 in the direction denoted by the arrow M1 with respect to the cam driven sprocket 221 and the exhaust camshaft 240 is restricted.

Note however that in state shown in FIG. 4 the low speed lock pin 217 is inserted in the low speed pin introduction hole 233d, and therefore the intake camshaft 230 cannot rotate either in the direction denoted by the arrow M1 or M2 with respect to the cam driven sprocket 221 and the exhaust camshaft 240.

Referring to FIG. 4, the state of the valve timing control device 200 during the low revolution period (the state in which the revolution speed of the engine 7 is low) will be described. During the low revolution period of the valve timing control device 200, weak centrifugal force acts on the weights 213 and 216. In this way, force that causes the weight 213 to rotate around the pivot axis 215 as denoted by the thick arrow M3 is generated. Force that causes the weight 216 to rotate around the pivot shaft 218 as denoted by the thick arrow M4 is also generated.

Then, when the weight 216 rotates in the direction of the thick arrow M4, force that causes the low speed lock pin 217 held by the weight 216 to be pulled out from the low speed pin introduction hole 233d of the intake camshaft 230 is generated (see the arrow M6).

Here, during the low revolution period, the spring S2 that is not shown (see FIG. 3) energizes the weight 216 in the +Z-direction, so that the elastic force of the spring S2 and the force acting in the direction of the thick arrow M4 are balanced. Consequently, the low speed lock pin 217 is not completely pulled out from the low speed pin introduction hole 233d.

Meanwhile, when the force acting in the direction of the thick arrow M3 is generated at the weight 213, force that causes the low speed lock pin 214 held by the weight 213 to be drawn to the intake camshaft 230 is generated (see the arrow M5). However, one end of the high speed lock pin 214 abuts against the contact surface 230M, and therefore the high speed lock pin 214 does not move in the direction of the axial center J. In this way, the weight 213 is not rotated either.

When the revolution speed of the engine 7 increases from a low value to a high value, the centrifugal force acting on the weights 213 and 216 increases.

Therefore, the force acting in the direction of the thick arrow M4 generated at the weight 216 is greater than the elastic force of the spring S2 in FIG. 4, so that the force in the direction of the arrow M6 that causes the low speed lock pin 217 to be pulled out from the low speed pin introduction hole 233d is increased.

In this way, the revolution speed of the engine 7 attains a first revolution speed that will be described, and as shown in FIG. 5, the low speed pin 217 is pulled out from the low speed pin introduction hole 233d.

Therefore, the intake camshaft 230 becomes rotatable in the direction of the arrow M2. Here, the reaction force from the intake locker arm that will be described is applied to the intake camshaft 230. In this way, force that rotates the intake camshaft 230 in the direction of the arrow M2 is generated, details of which will later be described.

In this way, the intake camshaft 230 rotates in the direction of the arrow M2 with respect to the cam driven sprocket portion 220. This allows the position of the high speed pin introduction hole 233c to match the position of one end of the high speed lock pin 214. Force based on centrifugal force by the weight 213 is generated at the high speed lock pin 214 in the direction of the arrow M5, and therefore one end of the high speed lock pin 214 is inserted into the high speed pin introduction hole 233c. At the time, the fixing pin 230B inserted in the pin floating groove 233b is positioned at the high speed groove end HP.

In this way, the intake camshaft 230 cannot rotate in the direction of the arrow M1 or M2. Therefore, during the high revolution period for the engine 7, the phase relation between the intake cam 231 and the exhaust cam 241 is fixed in a different state from that during the low revolution period for the engine 7.

Meanwhile, when the revolution speed of the engine 7 is lowered from a high value to a low value, the operation reversed from the above described operation is carried out.

More specifically, as shown in FIG. 5, when the revolution speed of the engine 7 is lowered from a high value and attains a second revolution speed that will be described, the weight 213 rotates in the direction opposite to the direction denoted by the thick arrow M3 by the elastic force of the spring S1. As a result, the high speed lock pin 214 is pulled out from the high speed pin introduction hole 233c of the intake camshaft 230.

In FIG. 5, the weight 216 is allowed to rotate in the direction opposite to the direction denoted by the thick arrow M4 by the elastic force of the spring S2 (see FIG. 4) that is not shown. Consequently, force directed in the opposite direction to the direction of the arrow M6 is applied to the low speed lock pin 217.

At the time, force that rotates the intake camshaft 230 in the direction of the arrow M1 is generated by the reaction force from the intake locker arm that will be described.

In this way, the intake camshaft 230 rotates in the direction of the arrow M1 and the low speed lock pin 217 is inserted in the low speed pin introduction hole 233d of the intake camshaft 230. This allows the intake camshaft 230 to be fixed in the state as shown in FIG. 4.

The pin floating grooves 233a (see FIG. 4) that is not shown in FIGS. 4 and 5 functions in the same manner as the pin floating groove 233b not described.

In FIG. 5, a projection 220T is denoted by a broken line. The projection 220T is provided to restrict the rotation of the weight 216 around the pivot shaft 218. For example, when the weight 216 turns for a prescribed amount, one surface of the weight 216 abuts against the projection 220T. In this way, the weight 216 largely rotates in the direction of the arrow M4, so that the low speed lock pin 217 can be prevented from being pulled out from the through hole 220c.

In this way, in the valve timing control device 200, the phase relation between the intake cam 231 and the exhaust cam 241 switches between the low and high revolution periods for the engine 7. Hereinafter, the state of the valve timing control device 200 during the low revolution period for the engine 7 (FIG. 4) will be referred to as "low revolution state" and the state of the valve timing control device 200 during the high revolution period for the engine 7 (FIG. 5) will be referred to as "high revolution state."

According to the embodiment, the revolution speed of the engine 7 at which the valve timing control device 200 switches from the low revolution state to the high revolution state is different from the revolution speed at which the valve timing control device 200 switches from the high revolution state to the low revolution state.

Figure 6:
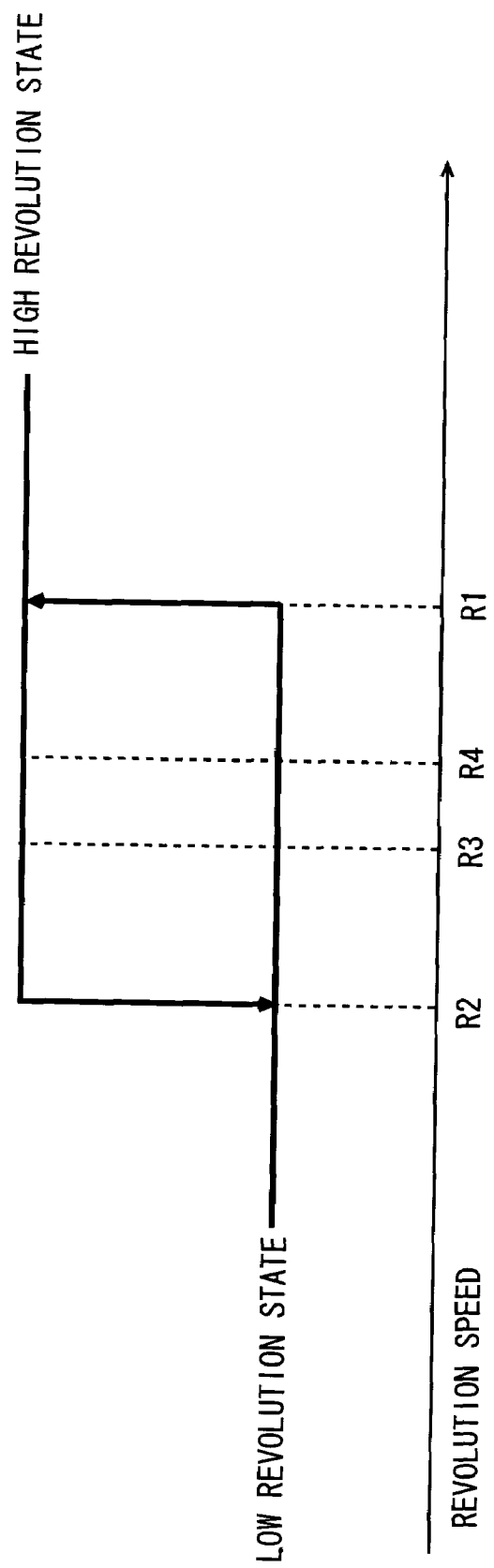
FIG. 6 is a chart for use in illustrating how a high revolution state and a low revolution state are switched in the valve timing control device.

FIG. 6 is a view for use in illustrating how the valve timing control device 200 is switched between the high revolution state and the low revolution state.

As shown in FIG. 6, when the valve timing control device 200 switches from the low revolution state to the high revolution state, a first revolution speed R1 becomes a threshold. Meanwhile, when the valve timing control device 200 switches from the high revolution state to the low revolution state, a second revolution speed R2 lower than the first revolution speed R1 becomes a threshold.

The first and second revolution speeds R1 and R2 are implemented by setting the components of the valve timing control device 200. For example, the springs S1 and S2 are set to have different elastic force. In this case, force acting on the high speed lock pin 214 held by the weight 213 and force acting on the low speed lock pin 217 held by the weight 216 are different.

In this way, the revolution speed at which the high speed lock pin 214 is pulled out from the high speed pin introduction hole 233c (the second revolution speed R2) and the revolution speed at which the low speed lock pin 217 is pulled out from the low speed pin introduction hole 233d (the first revolution speed R1) are different.

In this way, the first and second revolution speeds R1 and R2 are designed to be different, so that at the revolution speed at which centrifugal force applied to the weights 213 and 216 and the energizing force of the springs S1 and S2 are balanced (for example at the revolution speed from the revolution speeds R3 to R4 in FIG. 6), and hunting, in other words, unstable behavior of the valve can sufficiently be prevented. As a result, changes in the cam profile that would otherwise be caused by hunting can be prevented, so that the performance and durability of the engine can be prevented from being lowered.

(5) Driving of Valve Using Valve Timing Control Device

Now, how to drive the valve in the engine 7 using the valve timing control device 200 shown in FIGS. 3 to 5 will be described.

Figure 7:
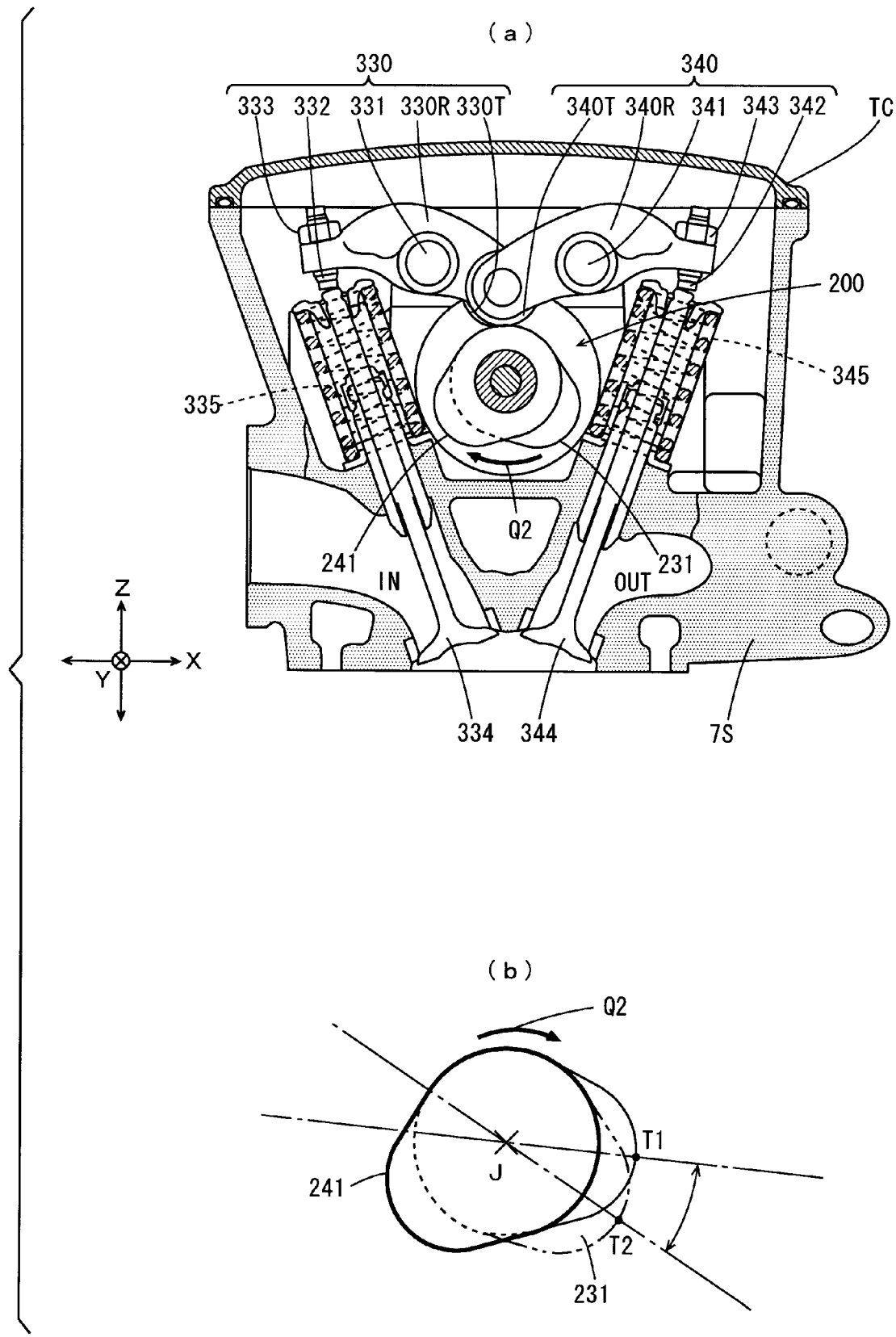
FIGS. 7(a) and 7(b) are detailed sectional views of a cylinder head.

FIG. 7(a) is a detailed sectional view of the cylinder head 7S shown in FIG. 2. In FIG. 7(a), the cylinder head 7S is viewed in the direction of the arrow P in FIG. 2. FIG. 7(b) is a view for use in illustrating the phase relation between the intake cam 231 and the exhaust cam 241. For easier understanding, the exhaust cam 241 is denoted by a thick solid line in FIG. 7(b). The intake cam 231 is denoted by a thin solid line and a dash double dotted line. Note that in FIG. 7, the valve timing control device 200 rotates in the direction of the arrow Q2. As indicated by the arrows X, Y, and Z, the three directions orthogonal to one another are defined as the X-, Y-, and Z-directions.

As shown in FIG. 7(a), in the cylinder head 7S, an intake rocker arm 330 is provided to extend in the X-direction from one side of the upper part of the valve timing control device 200, and an exhaust rocker arm 340 is provided to extend in the X-direction from the other side of the upper part of the valve timing control device 200.

The intake rocker arm 330 is held pivotably by a shaft 331 in its center. A roller 330T provided at one end of the intake rocker arm 330 abuts against the intake cam 231. An adjuster 332 is provided at the other end of the intake rocker arm 330. The upper end of the intake valve 334 is positioned under the adjuster 332. A valve spring 335 is provided at the intake valve 334, and the valve spring 335 energizes the intake valve 334 in the upward direction.

The exhaust rocker arm 340 is pivotably held by a shaft 341 in its center. The roller 340T provided at one end of the exhaust rocker arm 340 abuts against the exhaust cam 241. An adjuster 342 is provided at the other end of the exhaust rocker arm 340. The upper end of the exhaust valve 344 is positioned under the adjuster 342. A valve spring 345 is provided at the exhaust valve 344, and the valve spring 345 energizes the exhaust valve 344 in the upward direction.

As the valve timing control device 200 rotates, the rollers 330T and 340T move up and down. In this way, the intake rocker arm 330 pivots around the shaft 331, and the exhaust rocker arm 340 pivots around the shaft 341. In this way, the adjuster 332 of the intake rocker arm 330 drives the intake valve 334 in the upward and downward directions, and the adjuster 342 of the exhaust rocker arm 340 drives the exhaust valve 344 in the upward and downward directions.

Now, the upward and downward movement of the intake valve 334 and the exhaust valve 344 driven by the intake rocker arm 330 and the exhaust rocker arm 340 will be referred to as "lift" and the moving distance will be referred to as "lift amount."

Here, during the rotation of the intake cam 231 in the direction of the arrow Q2, when the cam nose moves away from the roller 330T, downward pressing force is applied from the roller 330T to the intake cam 231. The force acts to rotate the intake cam 231 in the direction of the arrow Q2. When the cam nose moves toward the roller 330T, downward pressing force is applied from the roller 330T to the intake cam 231. The force acts to rotate the intake cam 231 in the direction opposite to the direction of the arrow Q2.

Now, the function of force applied to the intake cam 231 by the roller 330T when the valve timing control device 200 switches from the low revolution state to the high revolution state or from the high revolution state to the low revolution state will be described.

As shown in FIG. 7(b), when the valve timing control device 200 is in the low revolution state, the tip end of the cam nose of the intake cam 231 is in a position T1 denoted by the solid line in FIG. 7(b). As the revolution speed of the engine 7 increases and reaches the first revolution speed R1 (FIG. 6), the low speed lock pin 217 is pulled out from the intake camshaft 230 as shown in FIGS. 4 and 5, and the intake camshaft 230 becomes pivotable in the direction of the arrow Q2 with respect to the cam driven sprocket portion 220 (FIGS. 4 and 5). Note that the direction of the arrow M2 in FIGS. 4 and 5 corresponds to the direction of the arrow Q2 in FIG. 7.

In this case, when the cam nose of the intake cam 231 moves away from the roller 330T, force that rotates the intake cam 231 in the direction of the arrow Q2 is applied to the intake cam 231, and therefore the intake camshaft 230 (FIGS. 4 and 5) rotates in the direction of the arrow Q2 with respect to the cam driven sprocket portion 220 (FIGS. 4 and 5). Therefore, the tip end of the cam nose of the intake cam 231 moves to a position T2 denoted by the dash double dotted line in FIG. 7(b). In the state, the intake camshaft 230 is fixed to the cam driven sprocket portion 220 (FIGS. 4 and 5) by the high speed lock pin 214 (FIGS. 4 and 5). More specifically, the valve timing control device 200 is switched to the high revolution state.

Meanwhile, when the revolution speed of the engine 7 is lowered to the second revolution speed R2 (FIG. 6) from the level at which the tip end of the cam nose of the intake cam 231 is in the position T2, the high speed lock pin 214 (FIGS. 4 and 5) is pulled out from the intake camshaft 230 (FIGS. 4 and 5), and the intake camshaft 230 becomes pivotable in the opposite direction to the direction of the arrow Q2 with respect to the cam driven sprocket portion 220 (FIGS. 4 and 5). Note that the direction of the arrow M1 in FIGS. 4 and 5 corresponds to the opposite direction of the direction of the arrow Q2 in FIG. 7.

In this case, when the cam nose of the intake cam 231 moves toward near the roller 330T, force that rotates the intake cam 231 in the direction opposite to the direction of the arrow Q2 is applied the intake cam 231, and therefore the intake camshaft 230 (FIGS. 4 and 5) rotates in the opposite direction to the direction of the arrow Q2 with respect to the cam driven sprocket portion 220 (FIGS. 4 and 5). Therefore, the tip end of the cam nose of the intake cam 231 moves to the position T1 denoted by the solid line in FIG. 7(b). In this state, the intake camshaft 230 is fixed to the cam driven sprocket portion 220 (FIGS. 4 and 5) by the low speed lock pin 217 (FIGS. 4 and 5). More specifically, the valve timing control device 200 is switched to the low revolution state.

(6) Changes in Valve Lift Amount

In the valve timing control device 200, the phase of the intake camshaft 231 with respect to the exhaust cam 241 is switched between the low revolution state and the high revolution state. In this way, the lift timing of the intake valve 334 and the exhaust valve 344 changes, details of which will be described.

Figure 8:
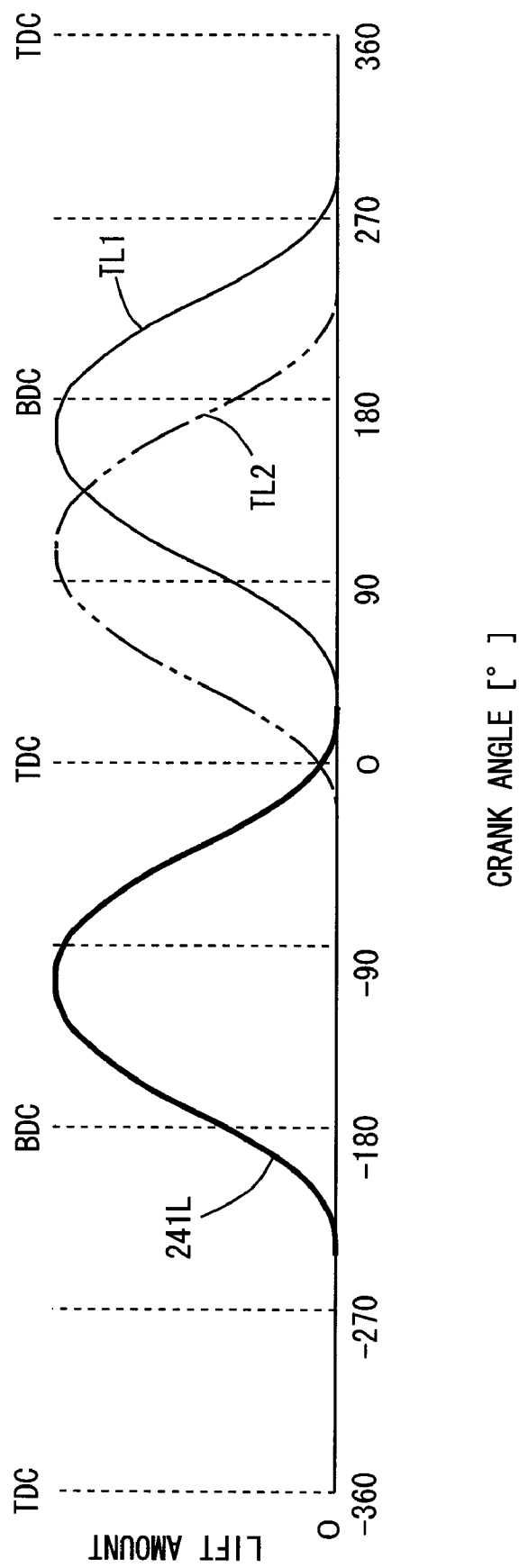
FIG. 8 is a chart for use in illustrating the lift amounts of an intake valve and an exhaust valve by the valve timing control device.

FIG. 8 is a chart showing the lift amounts of the intake valve 334 and the exhaust valve 344 by the valve timing control device 200.

In FIG. 8, the abscissa represents the crank angle (the rotation angle of the crankshaft 23), and the ordinate represents the lift amounts of the intake valve 334 and the exhaust valve 344.

In FIG. 8, the intake valve 334 and the exhaust valve 344 are open when the lift amount is greater than zero and closed when the lift amount is zero.

The crank angle is shown in the range from −360° to +360°. When the crank angle is 0°, 360°, and −360°, the piston 21 is positioned at the top dead center TDC in the cylinder 20, and when the crank angle is 180° and −180°, the piston 21 is positioned at the bottom dead center BDC in the cylinder 20.

The thick solid line 241L in FIG. 8 shows changes in the lift amount of the exhaust valve 344 driven by the exhaust cam 241 as the valve timing control device 200 rotates. As denoted by the thick solid line 241L, the lift amount of the exhaust valve 344 increases for the crank angle about in the range from −240° to −120° and decreases for the crank angle about in the range from −120° to 30°.

The solid line TL1 in FIG. 8 shows changes in the lift amount of the intake valve 334 driven by the intake cam 231 in the valve timing control device 200 in the low revolution state. As denoted by the solid line TL1, the lift amount of the intake valve 334 increases for the crank angle about in the range from 40° to 170° and decreases for the crank angle about in the range from 170° to 300°.

As described above, during the low revolution period for the engine 7, the overlap amount between the period in which the intake valve 334 is open and the period in which the exhaust valve 344 is open is small. In the example in FIG. 8, the overlap amount is zero.

Meanwhile, the dash double-dotted line TL2 in FIG. 8 represents the lift amount of the intake valve 334 driven by the intake cam 231 in the valve timing control device 200 in the high revolution state. As denoted by the dash double-dotted line TL2, the lift amount of the intake valve 334 increases for the crank angle about in the range from −30° to 100° and decreases for the crank angle about in the range from 100° to 230°.

In this way, when the valve timing control device 200 is in the high revolution state, the overlap amount between the period in which the intake valve 334 is open and the period in which the exhaust valve 344 is open is large.

In this way, the phase of the intake cam 231 changes relative to the exhaust cam 241 between the low revolution state and the high revolution state of the valve timing control device 200. Therefore, the overlap amount between the period in which the exhaust valve 344 is open and the period in which the intake valve 334 is open changes.

When the valve timing control device 200 is in the low revolution period, the overlap amount between the period in which the intake valve 334 is open and the period in which the exhaust valve 344 is open is small, so that toxic substances in exhaust gas are reduced and fuel consumption improves. When the valve timing control device 200 is in the high revolution state, the overlap amount between the period in which the intake valve 334 is open and the period in which the exhaust valve 344 is open is large and therefore high power output can efficiently be obtained.

(7) Detection of State of Valve Timing Control Device

Information about the operation of the valve timing control device 200 is applied as a cam signal CA from the cam sensor 250 (FIG. 2) to the ECU 500, details of which will be described.

Figure 9:
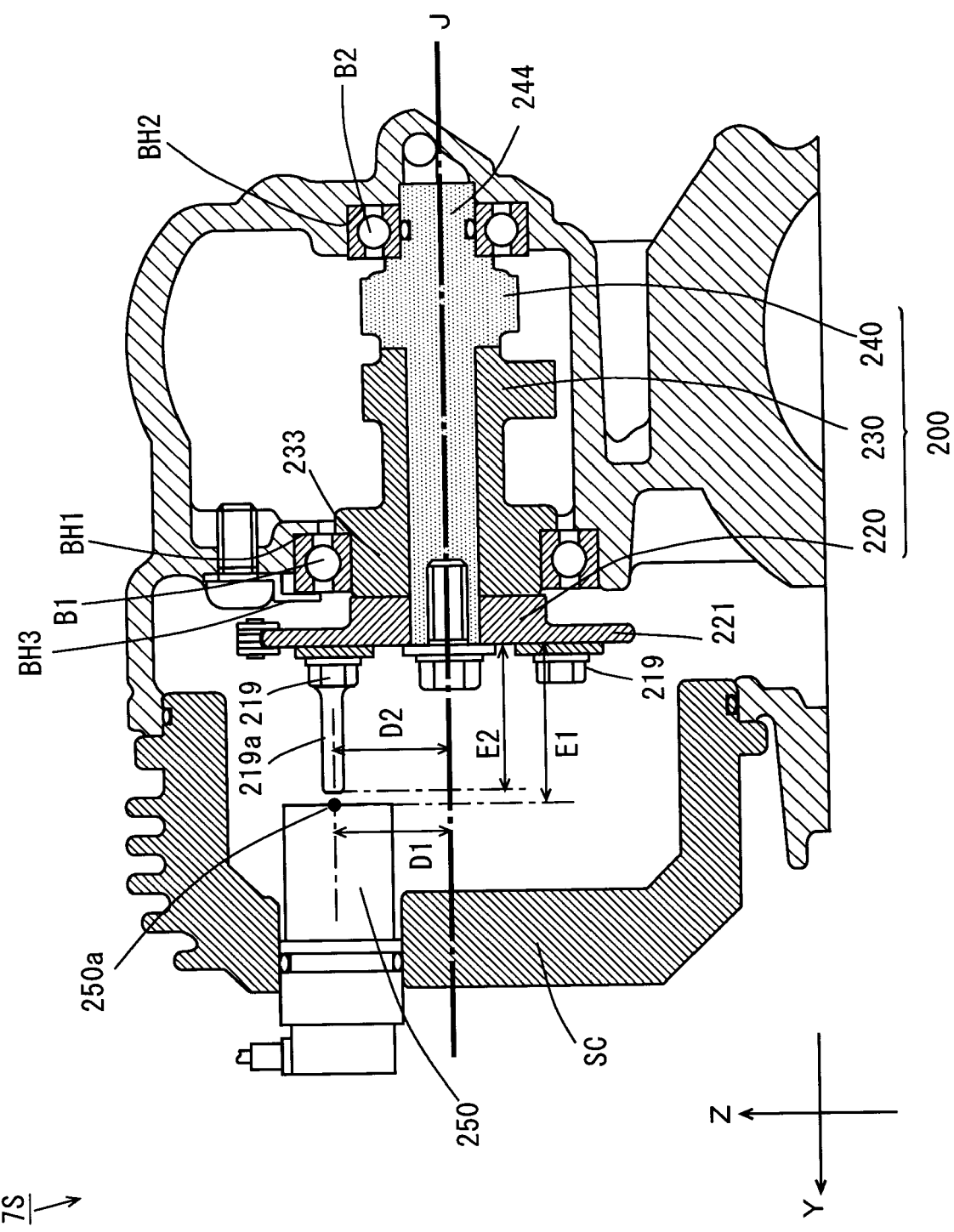
FIG. 9 is a detailed sectional view of the inside of the cylinder head.
Figure 10:
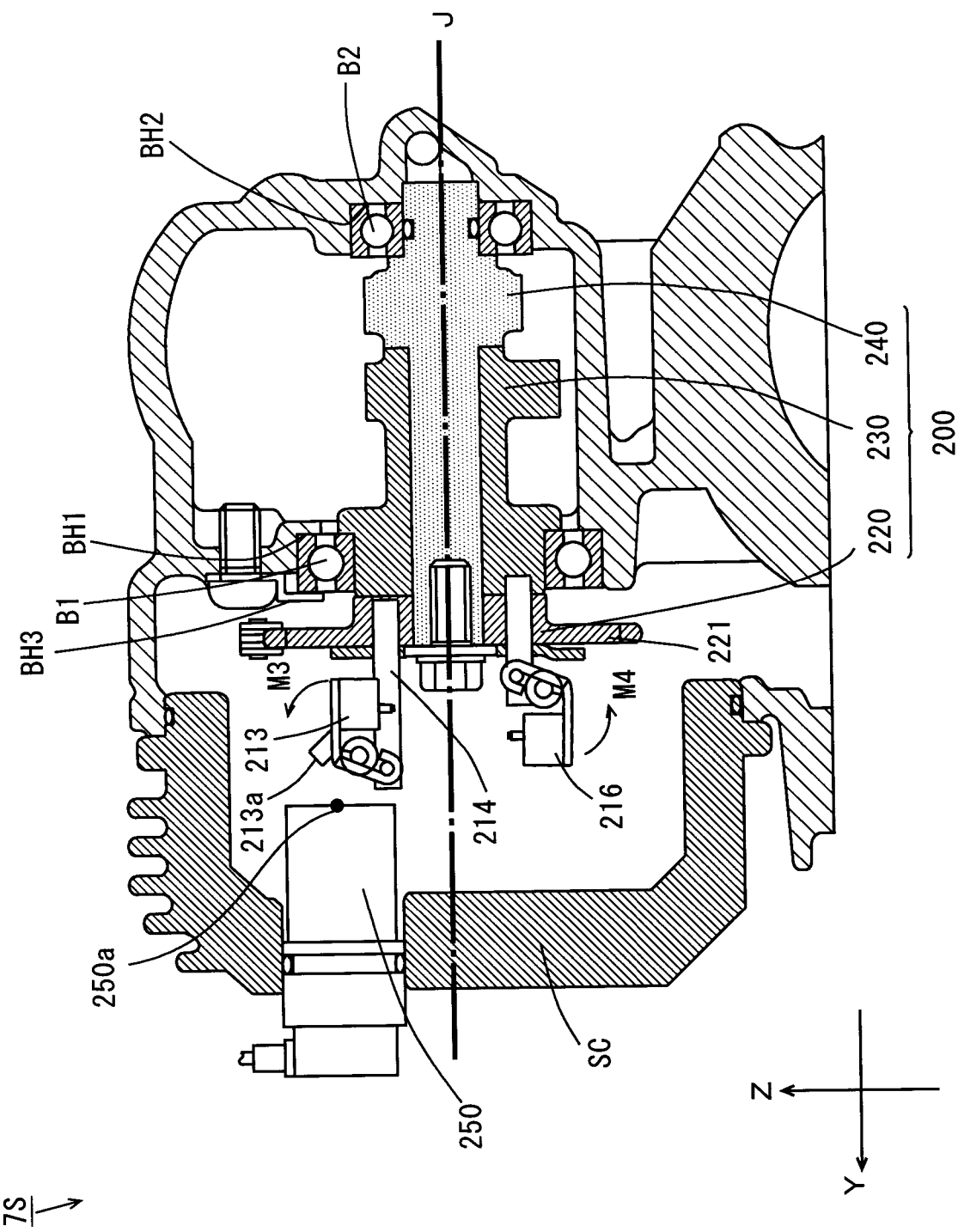
FIG. 10 is a sectional view of the valve timing control device and a cam sensor in a low revolution state.
Figure 11:
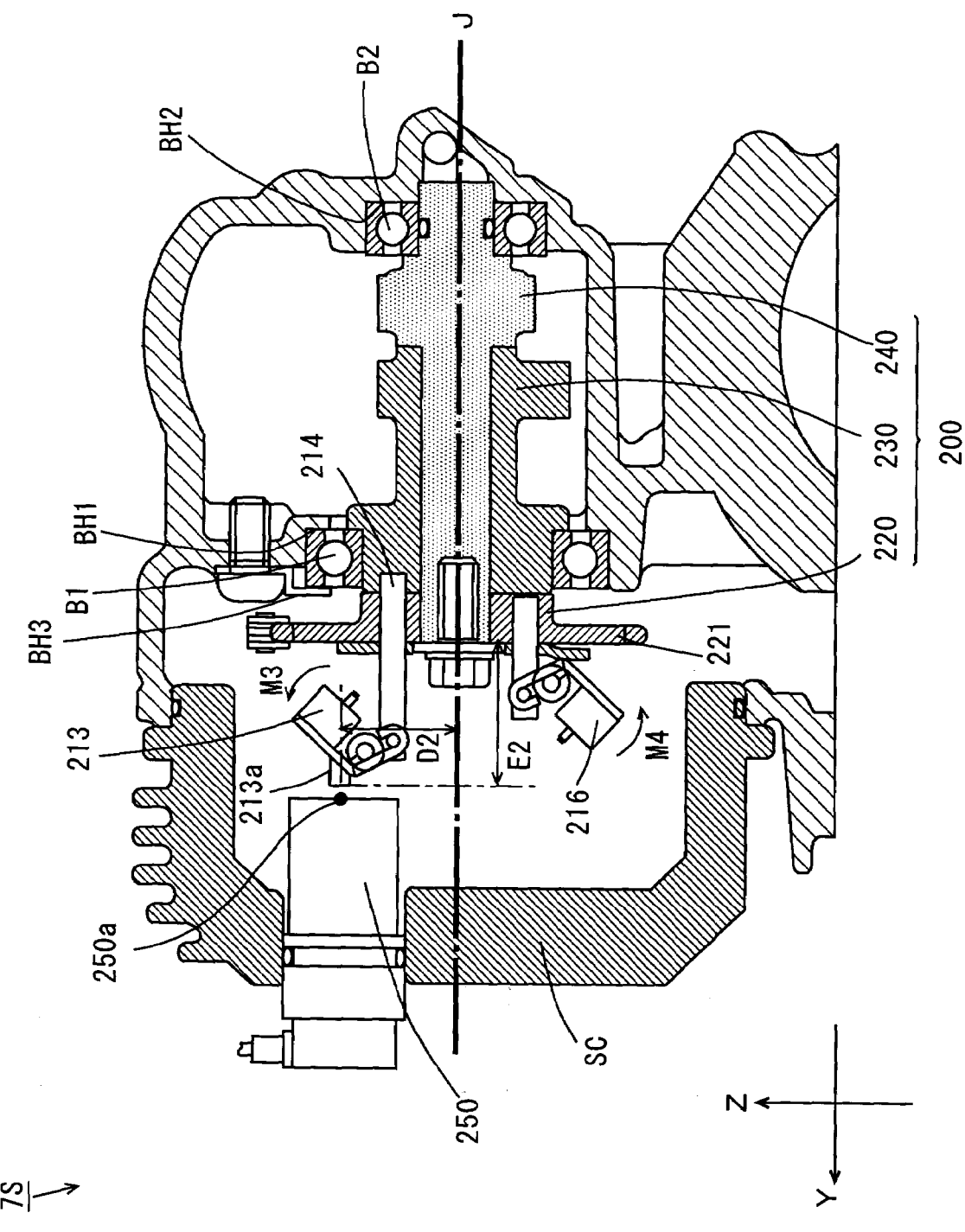
FIG. 11 is a sectional view of the valve timing control device and the cam sensor in a high revolution state.

FIGS. 9 to 11 are sectional views showing in detail the inside of the cylinder head 7S. FIG. 10 shows the valve timing control device 200 in the low revolution state and the cam sensor 250. FIG. 11 shows the valve timing control device 200 in the high revolution state and the cam sensor 250. In FIGS. 9 to 11, the directions denoted by the arrows Y and Z are defined as the Y-direction and the Z-direction. Note that a direction directed by an arrow is defined as "+" direction, while its opposite direction is defined as "−" direction. The thick dash dotted line in the figures represents the axial center J of the valve timing control device 200. In the valve timing control device 200 shown in FIG. 9, the projection 219a is positioned in the +Z-direction of the axial center J.

As shown in FIG. 9, during assembly of the valve timing control device 200 to the cylinder head 7S, the pivot shaft 233 and the projection shaft 244 of the valve timing control device 200 are provided with bearings B1 and B2.

In the cylinder head 7S, one end surface of the bearing B1 abuts against the internal abutment surface BH1 of the cylinder head 7S. One end surface of the bearing B2 abuts against the internal abutment surface BH2 of the cylinder head 7S.

As the valve timing control device 200 is accommodated in the cylinder head 7S, part of the other end surface of the bearing B1 abuts against a fixing plate BH3 connected to the cylinder head 7S.

In practice, the intake rocker arm 330, the exhaust rocker arm 340, the intake valve 334, and the exhaust valve 344 shown in FIG. 7 are provided above the valve timing control device 200 in the cylinder head 7S, but these elements are not shown in FIG. 9.

A side cover SC is provided to the cylinder head 7S to cover the side of the cam driven sprocket portion 220 of the valve timing control device 200. The cam sensor 250 is fixed to the side cover SC. For example, a magnetic pickup sensor is used as the cam sensor 250.

A detector 250a is provided in the center of the tip end surface of the cam sensor 250. The cam sensor 250 is provided so that the distance D1 between the detector 250a and the axial center J of the valve timing control device 200 is equal to the distance D2 between the projection 219a of the valve timing control device 200 and the axial center J and that the distance E1 between the detector 250a and the cam driven sprocket 221 of the valve timing control device 200 is slightly (for example about 3 mm) larger than the distance E2 between the tip end of the projection 219a and the cam driven sprocket 221 of the valve timing control device 200.

In this way, for each rotation of the valve timing control device 200, the projection 219a passes a detectable position a small distance apart from the detector 250a of the cam sensor 250.

When the projection 219a passes the detectable position of the detector 250a, the magnetic flux changes at the detector 250a, and induced electromotive force is generated at the cam sensor 250. As a result, a pulse is generated in the cam signal CA applied from the cam sensor 250 to the ECU 500. In this case, the valve timing control device 200 generates one pulse in the cam signal CA every time the valve timing control device 200 makes one rotation.

Now, referring to FIGS. 10 and 11, the relation between the projection 213a provided at the weight 213 and the cam sensor 250 will be described.

In FIGS. 10 and 11, the weight 213 is positioned to oppose the cam sensor 250.

As shown in FIG. 10, when the valve timing control device 200 is in the low revolution state, the weight 213 does not pivot in the direction of the arrow M3. In this way, the projection 213a of the weight 213 does not pass the detectable position, and a pulse is generated in the cam signal CA only when the projection 219a in FIG. 9 passes the detectable position.

On the other hand, as shown in FIG. 11, when the valve timing control device 200 is in the high revolution state, the weight 213 is pivoted in the direction of the arrow M3 by centrifugal force caused by rotation. At the time, the projection 213a provided at the weight 213 is parallel to the axial center J of the valve timing control device 200.

Here, when the projection 213a is parallel to the axial center J by the pivotal movement of the weight 213, the distance between the projection 213a and the axial center J of the valve timing control device 200 is equal to the distance D2 between the projection 219a and the axial center J of the valve timing control device 200 in FIG. 9. In the state, the distance between the tip end surface of the projection 213a and the cam driven sprocket 221 of the valve timing control device 200 is equal to the distance E2 between the tip end of the projection 219a and the cam driven sprocket 221 in FIG. 9.

In the way, the projection 213a of the weight 213 passes the detectable position of the cam sensor 250 for each rotation of the valve timing control device 200 similarly to the projection 219a.

Therefore, when the valve timing control device 200 is in the high revolution state, a pulse is generated in the cam signal CA both when the projection 219a passes the detectable position of the cam sensor 250 and when the projection 213a passes the detectable position.

In the circumferential direction around the axial center J, the length of the projection 213a is about three times larger than the length of the projection 219a. In this way, the pulse width of the pulse generated by the projection 213a is different from the pulse width of the pulse generated by the projection 219a. This allows the pulse generated by the projection 213a and the pulse generated by the projection 219a to be identified.

According to the embodiment, the projection 213a is formed to have a length larger than the length of the projection 219a, but the length of the projection 219a may be larger than that of the projection 213a.

Meanwhile, information about the rotation of the crankshaft 23 is applied as a crank signal CR from the crank sensor 260 (FIG. 2) to the ECU 500.

More specifically, a plurality of projections are provided at the crankshaft 23, and as the crankshaft 23 rotates, the projections pass the detectable position of the crank sensor 260. In this way, the crank signal CR applied from the crankshaft 23 to the ECU 500 has a plurality of thus generated pulses. According to the embodiment, the projections are provided at equal intervals of 30° at the outer circumferential surface of the crankshaft 23. In this way, for each rotation of the crankshaft 23, 12 pulses are generated in the crank signal CR.

(8) Processing of Cam Signal and Crank Signal

Figure 12:
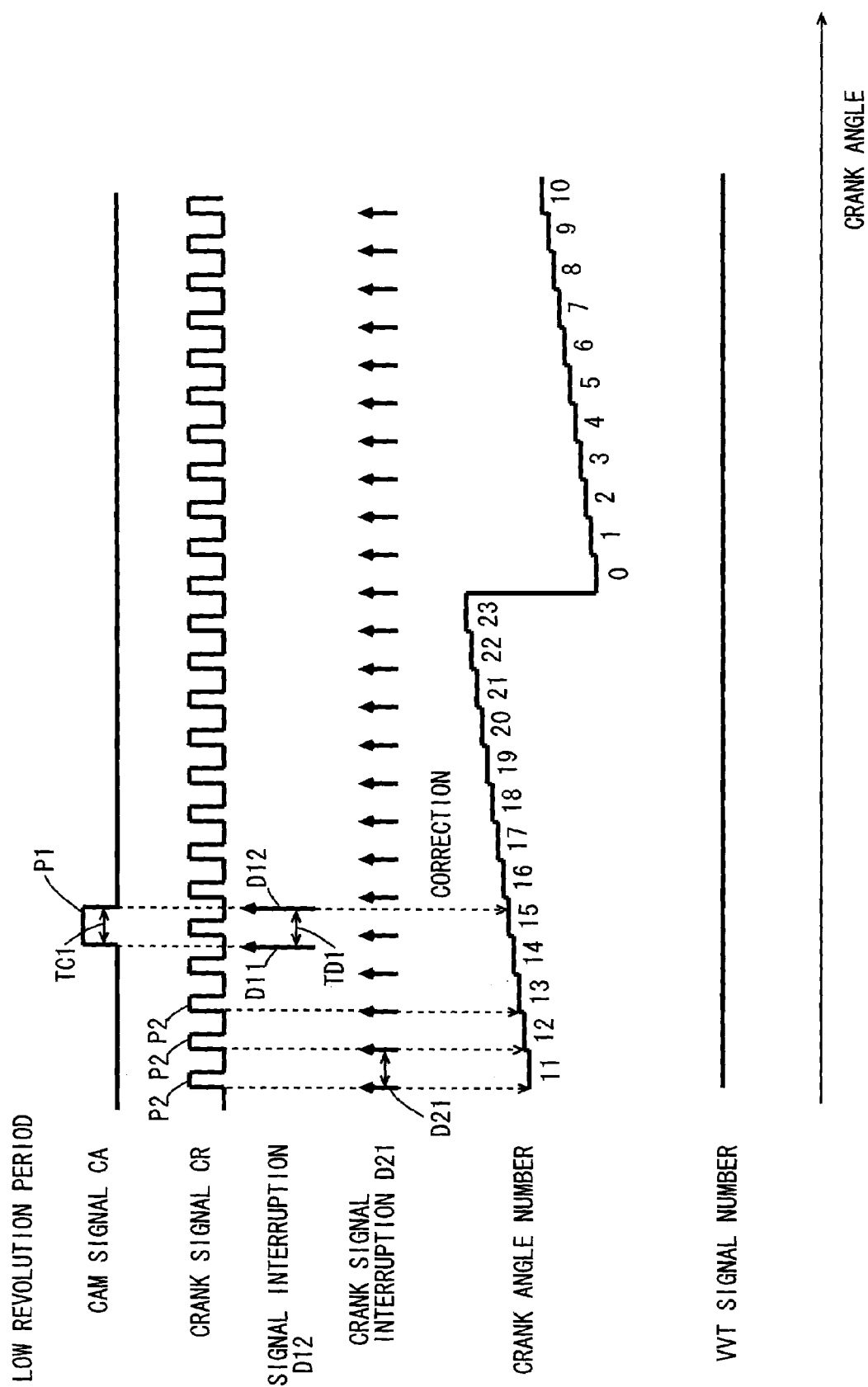
FIG. 12 is a timing chart for use in illustrating an example of processing carried out by an ECU based on a cam signal and a crank signal.
Figure 13:
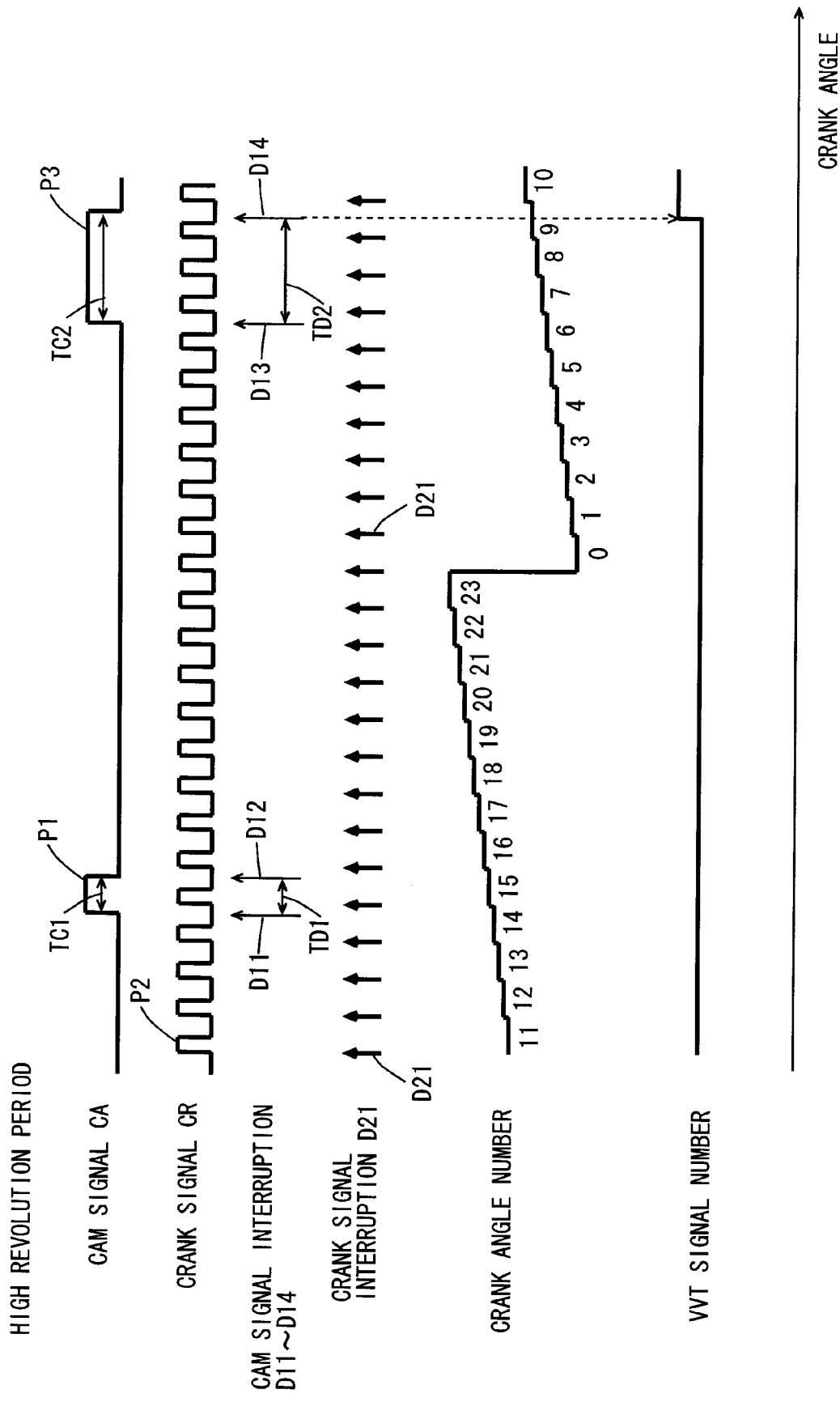
FIG. 13 is a timing chart for use in illustrating an example of processing carried out by the ECU based on the cam signal and the crank signal.

FIGS. 12 and 13 are timing charts for use in illustrating an example of processing carried out by the ECU 500 based on the cam signal CA and the crank signal CR. FIG. 12 shows processing by the ECU 500 when the valve timing control device 200 is in the low revolution state, and FIG. 13 shows processing by the ECU 500 when the valve timing control device 200 is in the high revolution state. In FIGS. 12 and 13, the abscissa represents the crank angle. The crank angle is shown in the range from an arbitrary angle to an angle 720° advanced from the angle (for one cycle of the engine 7).

As shown in FIG. 12, when the valve timing control device 200 is in the low revolution state, the projection 219a (FIG. 9) passes the detectable position of the cam sensor 250, so that a pulse P1 having a pulse width TC1 is generated in the cam signal CA.

When a plurality of projections formed at the crankshaft 23 (FIG. 2) pass the detectable position of the crank sensor 260, a plurality of pulses P2 are generated at equal intervals in the crank signal CR. As described above, for each rotation of the crankshaft 23, 12 pulses P2 are generated in the crank signal CR, and therefore 24 pulses P2 are generated in the crank signal CR for one cycle of the engine 7.

In response to the pulses P1 and P2 in the cam signal CA and the crank signal CR, a plurality of interruptions are generated in the ECU 500.

In response to the rising edge of a pulse P1 in the cam signal CA, a cam signal interruption D11 is generated, and in response to the falling edge of the pulse P1, a cam signal interruption D12 is generated. The interruption interval TD1 between the cam signal interruption D11 and the cam signal interruption D12 is equal to the pulse width TC1.

In response to the rising edge of a pulse P2 in the crank signal CR, a crank signal interruption D21 is generated. The interruption interval between crank signal interruptions D21 is equal to the pulse interval of the pulses P2 (the cycle of the crank signal CR).

In practice, for example a pulse attributable to a noise other than the pulses P1 and P2 is sometimes generated in the cam signal CA and the crank signal CR. Therefore, in addition to the cam signal interruptions D11 and D12 and the crank signal interruptions D21, other interruptions are generated.

Here, the ECU 500 responds to the 24 crank signal interruptions D21 to set crank angle numbers "0" to "23". The ECU 500 identifies the crank angle in one cycle in the engine 7 in 24 levels based on a crank angle number in the range from "0" to "23". For example, in response to a crank signal interruption D21 generated for the first time after the compression top dead center (the top dead center in the compression stroke), a crank angle number "0" is set. In this case, fuel injection or spark ignition is controlled with reference to the timing of obtaining the crank angle "0".

The ECU 500 corrects the crank angle number based on a cam signal interruptions D12. More specifically, when a cam signal interruption D12 is generated, the ECU 500 sets the crank angle number to a prescribed value (in the example in FIGS. 12 and 13, the crank angle number is set to "15" when the cam signal interruption D12 is generated). In this case, if the crank angle number is erroneously set by a noise as described above, the crank angle number is corrected to an accurate value for each cycle. In this way, a crank angle identified by the ECU 500 based on a crank angle number can be prevented from being greatly deviated from an actual crank angle.

The ECU 500 sets a VVT signal number. When the valve timing control device 200 is in the low revolution state, the VVT signal number is maintained at "0".

As shown in FIG. 13, when the valve timing control device 200 is in the high revolution state, the projection 213a (FIG. 11) passes the detectable position of the cam sensor 250, so that a pulse P3 having a pulse width TC2 is generated in the cam signal CA. In this way, a cam signal interruption D13 is generated in response to the rising edge of the pulse P3, and a cam signal interruption D14 is generated in response to the falling edge of the pulse P3.

Note that the pulse P1 in the cam signal CA, the crank signal CR, the cam signal interruptions D11 and D12, the crank signal interruptions D21 and the crank angle number are the same as those when the valve timing control device 200 is in the low revolution state as shown in FIG. 12.

In practice, for example a pulse attributable to a noise other than the pulses P1 to P3 is sometimes generated in the cam signal CA and the crank signal CR. Therefore, in addition to the cam signal interruptions D11 to D14 and the crank signal interruptions D21, other interruptions are generated.

Hereinafter, an interruption generated in response to the rising of a pulse will generically be referred to as "rising interruption" and an interruption generated in response to the falling of a pulse will generically be referred to as "falling interruption." The rising interruptions include the cam signal interruptions D11 and D13, the crank signal interruptions D21, and interruptions generated by the rising of a pulse by another cause such as a noise. The falling interruptions include the cam signal interruptions D12 and D14 and interruptions generated by the falling of a pulse by another cause such as a noise.

The ECU 500 increments the VVT signal number by one whenever a cam signal interruption D14 is generated. In this case, for each cycle of the engine 7 it is determined whether or not the VVT signal number has been incremented, so that it can be determined whether or not a cam signal interruption D14 was generated.

More specifically, whenever a cam signal interruption D12 is generated, the ECU 500 determines whether or not the VVT signal number has been incremented from the previous number.

When the VVT signal number has been incremented, it is determined that a cam signal interruption D14 was generated within one cycle before the generation of the cam signal interruption D12. In this way, it is determined that the valve timing control device 200 is in the high revolution state.

When the VVT signal number has not been incremented, it is determined that no cam signal interruption D14 was generated within one cycle before the generation of the cam signal interruption D12. In this way, it is determined that the valve timing control device 200 is in the low revolution period.

According to the embodiment, based on these kinds of information, the spark ignition timing by the ignition plug 280, the fuel injection amount and the fuel injection timing by the injector 290 are controlled. Now, referring to FIGS. 14 to 17, the control operation of the ignition plug 280 and the injector 290 by the ECU 500 will be described.

(9) Control by ECU

Figure 14:
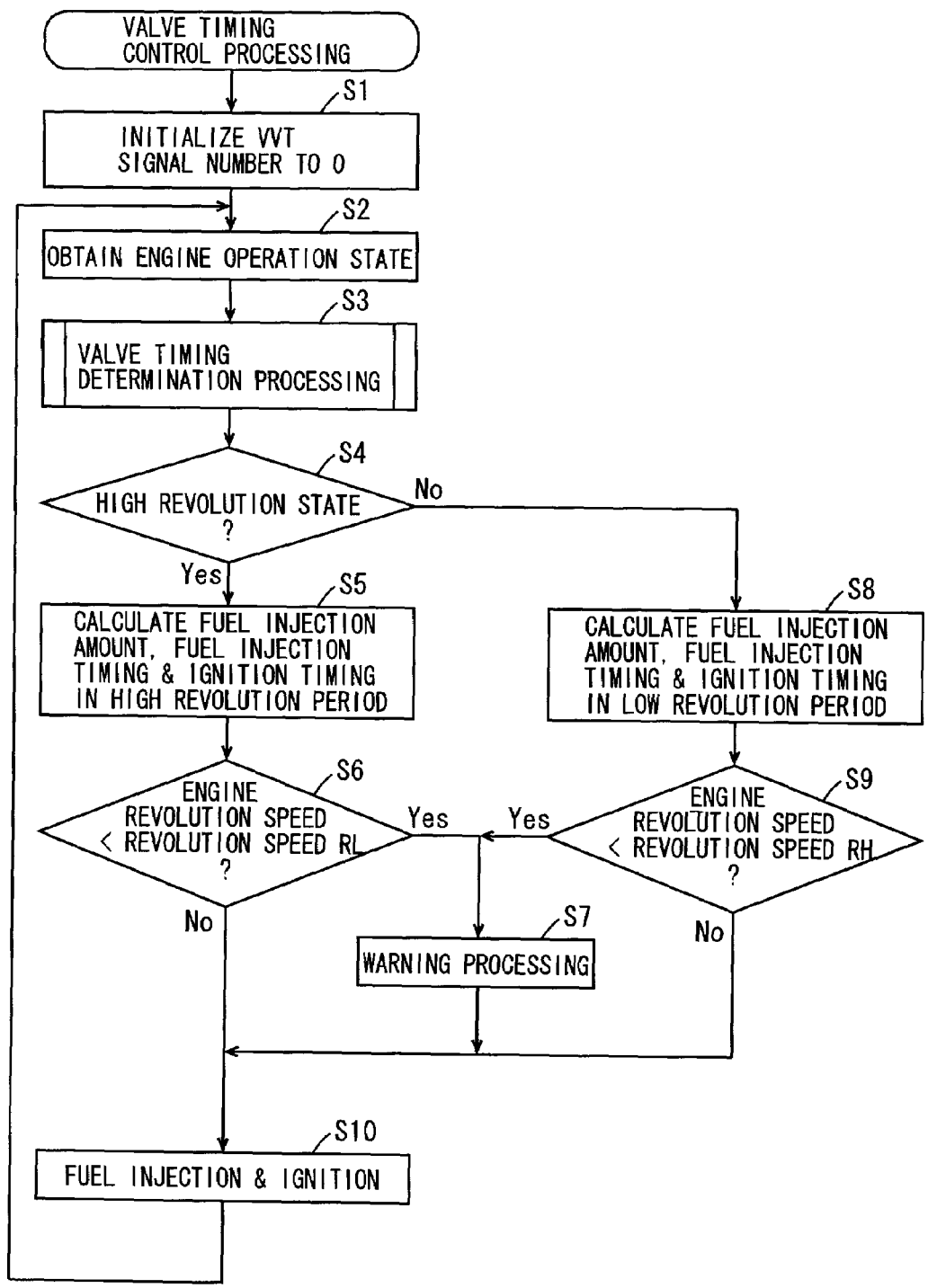
FIG. 14 is a flowchart for use in illustrating valve timing control processing by the ECU.

FIG. 14 is a flowchart for use in illustrating valve timing control processing by the ECU 500.

As shown in FIG. 14, the ECU 500 initializes the VVT signal number (FIG. 13) to "0" (step S1).

Now, the ECU 500 obtains the operation state of the engine 7 including the cam signal CA, the crank signal CR, and the throttle opening TR (step S2).

The ECU 500 then carries out valve timing determination processing based on the operation state obtained in step S2 (step S3). Here, it is determined whether the valve timing control device 200 is in the low revolution state or in the high revolution state. In step S3, the revolution speed of the engine 7 (hereinafter referred to as "engine revolution speed") is calculated based on the crank signal CR. The valve timing determination processing in step S3 will be detailed later.

As a result of the valve timing determination processing in step S3, if the valve timing control device 200 is in the high revolution state, the ECU 500 calculates a fuel injection amount and fuel injection timing by the injector 290 (FIG. 2) and spark ignition timing by the ignition plug 280 (FIG. 2) based on the throttle opening TR obtained in step S2 and the calculation result of the engine revolution speed in the step S3 (steps S4 and S5). In this case, for example a map operation using a preset map for the high revolution state is carried out to calculate the fuel injection amount, the fuel injection timing, and the ignition timing.

The ECU 500 then determines whether the calculation result of the engine revolution speed in step S3 is lower than a preset revolution speed RL (step S6). The revolution speed RL is set to a lower value than the second revolution speed R2 (FIG. 6) described above. In this way, it is determined whether or not the valve timing control device 200 normally functions.

In step S6, if the engine revolution speed is determined to be lower than the revolution speed RL, the valve timing control device 200 does not normally function, and therefore warning processing to the user is carried out (step S7). In the warning processing, a warning buzzer, a warning lamp, or the like is utilized.

As a result of the valve timing determination processing in step S3, if the valve timing control device 200 is in the low revolution state, the ECU 500 calculates a fuel injection amount and fuel injection timing by the injector 290 (FIG. 2) and spark ignition timing by the ignition plug 280 (FIG. 2) based on the throttle opening TR obtained in step S2 and the calculation result of the engine revolution speed in step S3 (steps S4 and S8). In this case, a map operation using a preset map for the low revolution state is carried out to calculate the fuel injection amount, the fuel injection timing, and the ignition timing.

The ECU 500 then determines whether or not the calculation result of the engine revolution speed in step S3 is higher than a preset revolution speed RH (step S9). The revolution speed RH is set to a value higher than the first revolution speed R1 (FIG. 6) described above. Here, similarly to step S6, it is determined whether or not the valve timing control device 200 normally functions.

If it is determined in step S9 that the engine revolution speed is higher than the revolution speed RH, the valve timing control device 200 does not normally function, and therefore warning processing to the user is carried out (step S7).

Note that if the valve timing control device 200 does not normally function as the result of determination in step S6 or S9, the fuel injection amount, the fuel injection timing, and the spark ignition timing may be switched to preset values so that the load on the engine 7 can be alleviated.

If it is determined in step S6 that the engine revolution speed is not less than the revolution speed RL, or if it is determined in step S9 that the engine revolution speed is not more than the revolution speed RH, it is determined that the valve timing control device 200 normally functions. In this case, the ECU 500 makes a command to the injector 290 to carry out fuel injection in response to a fuel injection signal FI based on the calculation results of the fuel injection amount and the fuel injection timing in step S5 or S8 and the ignition plug 280 to ignite in response to a spark ignition signal SI based on the calculation result of the spark injection timing in step S8 (step S10). In this way, the injector 290 can carry out fuel injection in an appropriate amount with appropriate timing based on the valve timing of the intake valve 334 and the exhaust valve 344 (FIG. 8). The ignition plug 280 can carry out spark ignition with appropriate timing based on the valve timing of the intake valve 334 and the exhaust valve 344. Thereafter, the ECU 500 repeats the processing in steps S2 to S10.

Figure 15:
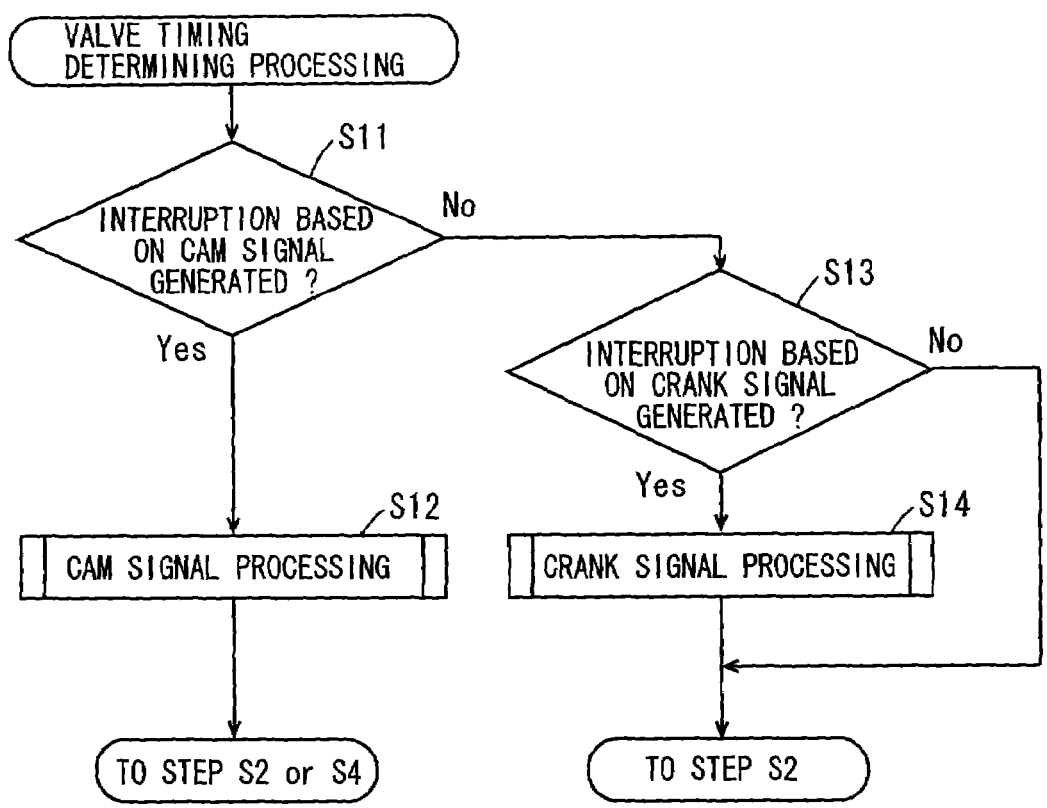
FIG. 15 is a flowchart for use in illustrating the valve timing control processing by the ECU.

FIG. 15 is a flowchart for use in illustrating in detail the valve timing determination processing (step S3) in FIG. 14.

As shown in FIG. 15, the ECU 500 determines whether or not an interruption in response to the cam signal CA has been generated (step S11).

If there has been an interruption in response to the cam signal CA, the ECU 500 carries out the following cam signal processing (step S12). Thereafter, the ECU 500 proceeds to the processing in step S2 or step S4 in FIG. 14.

If there is no interruption generated in response to the cam signal CA, the ECU 500 determines whether or not an interruption in response to the crank signal CR has been generated (step S13).

In step S13, if an interruption in response to the crank signal CR has been generated, the ECU 500 carries out the following the crank signal processing (step S14) and the ECU 500 then returns to the processing in step S2 in FIG. 14.

Figure 16:
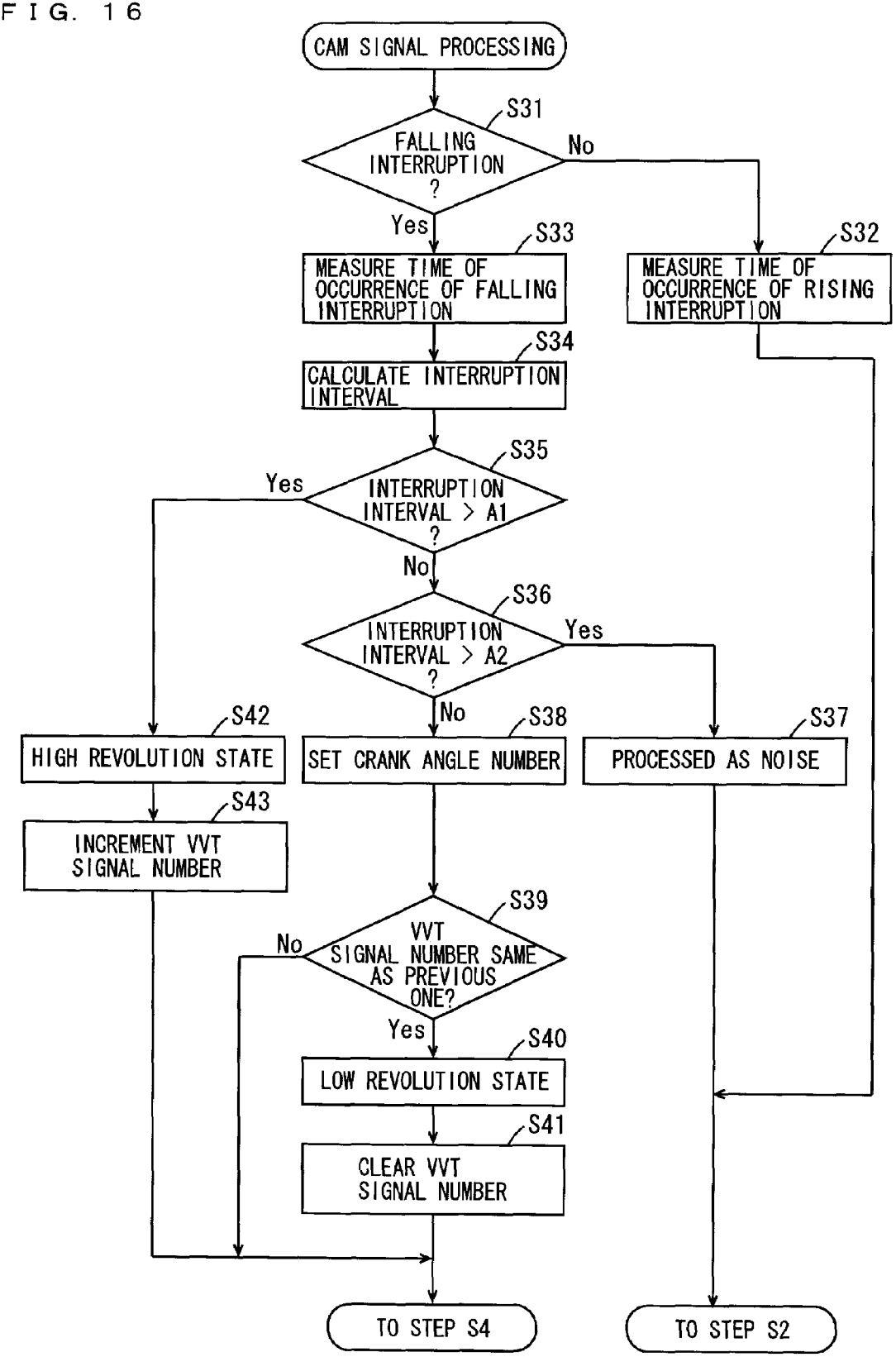
FIG. 16 is a flowchart for use in illustrating the valve timing control processing by the ECU.

FIG. 16 is a flowchart for use in illustrating in detail the cam signal processing (step S12) in FIG. 15.

The ECU 500 determines whether or not the interruption generated in step S11 in FIG. 15 is a falling interruption (step S31).

If the interruption generated in step S11 in FIG. 15 is not a falling interruption, in other words, if it is a rising interruption, the ECU 500 measures the time of the occurrence of the rising interruption (step S32). Thereafter, the ECU 500 returns to the processing in step S2 in FIG. 14.

In step S31, if the interruption generated in step S11 in FIG. 15 is a falling interruption, the ECU 500 measures the time of occurrence of the falling interruption (step S33).

Then, the ECU 500 calculates the interruption interval between the rising interruption measured in step S32 and the falling interruption measured in step S33 (step S34).

Then, the ECU 500 determines whether or not the interruption interval measured in step S34 is larger than a preset value A1 (step S35). The preset value A1 is set to a value not less than the interruption interval TD1 between the cam signal interruptions D11 and D12 and smaller than the interruption interval TD2 between the cam signal interruptions D13 and D14.

If it is determined that the interruption interval is not more than the prescribed value A1, the ECU 500 determines whether or not the interruption interval is smaller than a prescribed value A2 (step S36). The prescribed value A2 is set to a value smaller than the interruption interval TD1 between the cam signal interruptions D11 and D12.

If it is determined that the interruption interval is smaller than the prescribed value A2, the ECU 500 processes the rising interruption generated in step S11 as a noise (step S37). More specifically, the ECU 500 returns to the processing in step S2 without carrying out any processing.

In step S36, if it is determined that the interruption interval is not less than the prescribed value A2, it is determined that the interruption generated in step S11 is a cam signal interruption D12. Therefore, the ECU 500 sets the crank angle number to a prescribed value (step S38) in order to correct the crank angle number.

Then, the ECU 500 determines whether or not the VVT signal number is the same as the previous one (step S39). If the VVT signal number is the same as the previous one, the ECU 500 determines that the valve timing control device 200 is in the low revolution state (step S40) and clears the VVT signal number to zero as the initial value (step S41). The ECU 500 then proceeds to the processing in step S4 in FIG. 14.

In step S35, if the interruption interval is larger than the prescribed value A2, the ECU 500 determines that the valve timing control device 200 is in the high revolution state (step S42) and increments the VVT signal number by one (step S43). Then, the ECU 500 proceeds to the processing in step S4 in FIG. 14.

Figure 17:
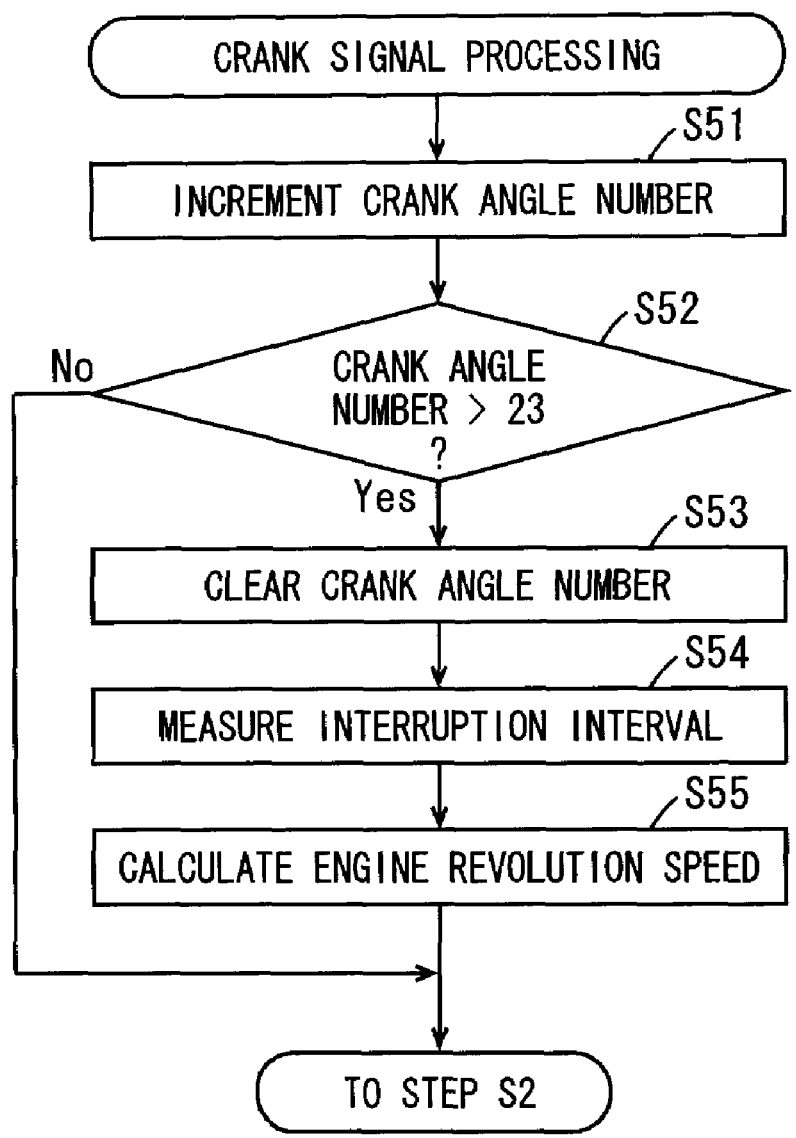
FIG. 17 is a flowchart for use in illustrating the valve timing control processing by the ECU.

FIG. 17 is a flowchart for use in illustrating in detail the crank signal processing (step S14) in FIG. 15.

As shown in FIG. 17, the ECU 500 increments the present crank angle number by one (step S51).

The ECU 500 then determines whether the crank angle number exceeds 23 (step S52). If the crank angle number exceeds 23, the ECU 500 clears the crank angle number to zero (step S53).

The ECU 500 then calculates the interruption interval between the interruption generated in step S13 and the previously generated interruption (step S54). The ECU 500 calculates the engine revolution speed based on the calculated interruption interval (step S55). Thereafter, the ECU 500 returns to the processing in step S2 in FIG. 14.

(10) Effects of Embodiments

According to the embodiment, the phase relation between the intake cam 231 and the exhaust cam 241 of the valve timing control device 200 switches between the low revolution period and the high revolution period in response to changes in centrifugal force caused by the revolution of the engine 7. In this way, the valve timing of the intake valve 334 and the exhaust valve 344 can appropriately be switched in response to the revolution speed of the engine 7.

The ECU 500 accurately determines whether the phase relation between the intake cam 231 and the exhaust cam 241 of the valve timing control device 200 is the phase relation in the high revolution period or the low revolution period based on whether or not the projection 213a of the weight 213 is detected by the cam sensor 250. In this way, the ECU 500 can accurately determine the valve timing of the intake valve 334 and the exhaust valve 344.

Therefore, the ECU 500 can appropriately control the fuel injection amount, the fuel injection timing, and the spark ignition timing based on the valve timing of the intake valve 334 and the exhaust valve 344.

In addition, the projection 219a is detected by the cam sensor 250, so that the crank angle number is always corrected to an accurate number. This allows the ECU 500 to accurately control the fuel injection amount, the fuel injection timing, and the spark ignition timing based on the crank angle number.

As described above, using the common cam sensor 250 in the cylinder head 7S, the switching in the phase relation between the intake cam 231 and the exhaust cam 241 of the valve timing control device 200 can accurately be determined, and the crank angle number can always be corrected to an accurate value. In this way, the engine 7 can be reduced in size, and the manufacturing cost can be prevented from being increased.

(11) Correspondences Between Elements Recited in Claims and Elements in Embodiments Now, examples of correspondences between elements recited in the claims and the elements in the embodiments will be described, but the invention is not limited to those described examples.

In the above-described embodiment, the valve timing control device 200 and the cam sensor 250 are an example of a variable valve system, the cam driven sprocket 221 is an example of a rotation member, the intake camshaft 230 is an example of the cam member, the state of the intake camshaft 230 when the valve timing control device 200 is in the low revolution state is an example of a first state, the state of the intake camshaft 230 when the valve timing control device 200 is in the high revolution state is an example of a second state, the projection 213*a* is an example of a first detection portion, weights 213 and 216 are examples of a moving member, the cam sensor 250 is an example of a detector, and the projection 219*a* is an example of a second detection portion.

The engine 7 and the ECU 500 are an example of an engine system, the intake valve 334 and the exhaust valve 344 are examples of a valve, the ECU 500 is an example of a controller, the cam signal CA is an example of the output signal of a detector, and the pulse widths TC1 and TC2 are examples of a detection period.

The motorcycle 100 is an example of a vehicle, and the rear wheel 11 is an example of a driving member.

As the elements recited in the claims, various other elements having the structure or function as recited in the claims may be employed.

(12) Other Embodiments (12-1) In the above-described embodiment, the cam sensor 250 is provided parallel to the axial center J of the valve timing control device 200 to oppose one surface of the cam driven sprocket 221 (FIGS. 9 to 11) but the cam sensor 250 may be provided in other positions.

Figure 18:
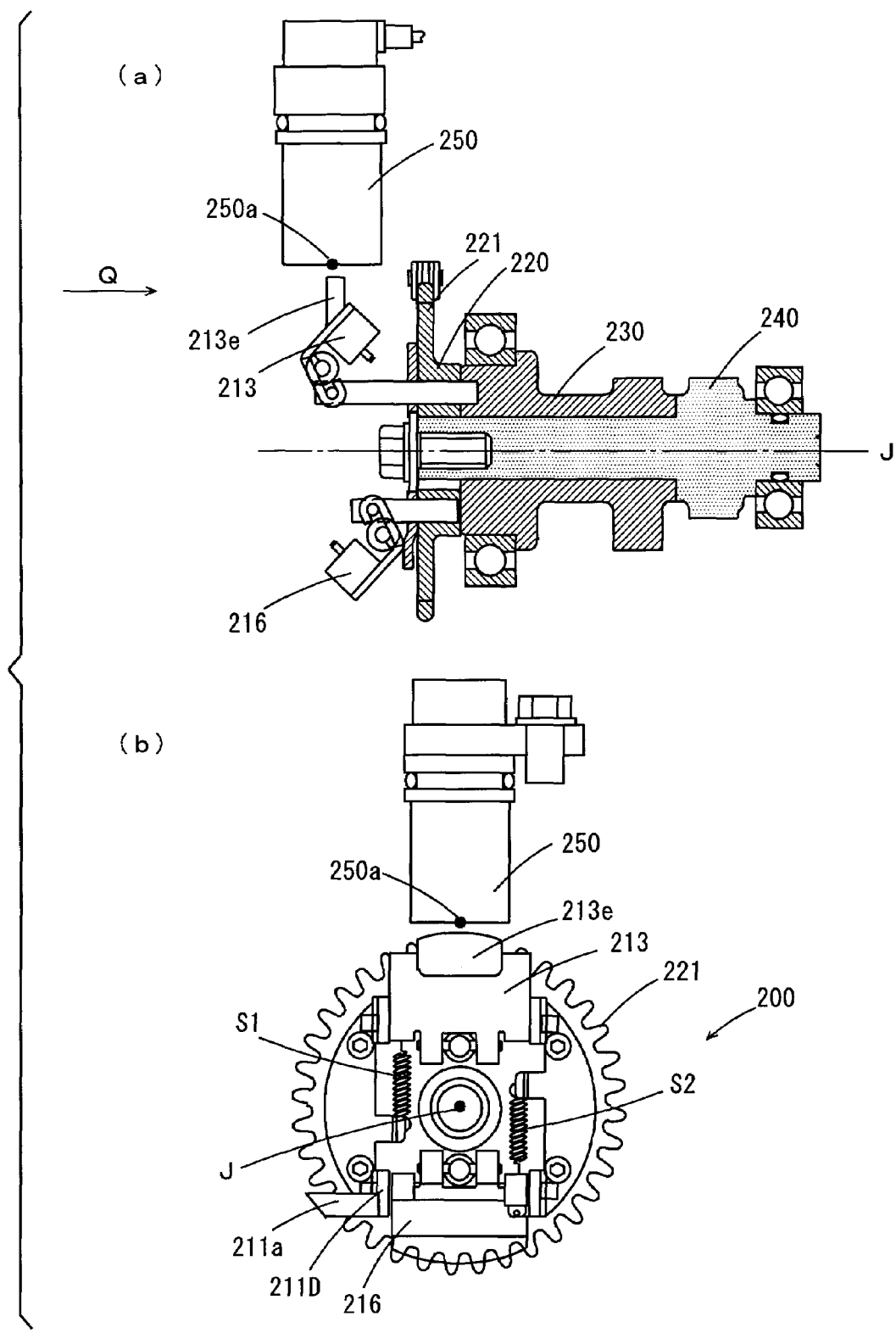
FIGS. 18(a) and 18(b) are views of another example of arrangement of the cam sensor.

FIG. 18 shows another example of positioning of the cam sensor 250. FIG. 18(*a*) is a sectional view showing the arrangement of the valve timing control device 200 and the cam sensor 250, and FIG. 18(*b*) is a side view of the cam sensor 250 and the valve timing control device 200 in FIG. 18(*a*) when they are viewed in the direction of the arrow Q. Note that FIG. 18 shows the valve timing control device 200 in the high revolution state.

As shown in FIGS. 18(*a*) and 18(*b*), the cam sensor 250 is provided orthogonally to the axial center J of the valve timing control device 200 on one surface side of the cam driven sprocket 221 of the valve timing control device 200.

The weight 213 of the valve timing control device 200 has a projection 213*e*. When the valve timing control device 200 is in the high revolution state, the projection 213*e* is parallel to one surface of the cam driven sprocket 221.

As shown in FIG. 18(*b*), the projection 211D of the supporter 211 has a projection 211*a*. The projection 211*a* is parallel to one surface of the cam driven sprocket 221.

Note that in the circumferential direction around the axial center J, the projection 213*e* has a length about three times that of the projection 211*a*.

When the valve timing control device 200 is in the high revolution state, the projection 213*e* formed at the weight 213 and the projection 211*a* formed at the projection 211D pass the detectable position of the cam sensor 250. In this way, pulses by the projections 213*e* and 211*a* are generated in the cam signal CA.

When the valve timing control device 200 is in the low revolution state, the energizing force of the spring S1 (FIG. 18(*b*)) causes the weight 213 to pivot from the state shown in FIG. 18(*a*), and the projection 213*e* of the weight 213 does not pass the detectable position of the cam sensor 250. In this way, only the pulse by the projection 211*a* is generated in the cam signal CA.

Based on these pulses generated in the cam signal CA, the control operation described in conjunction with FIGS. 14 to 17 is carried out by the ECU 500.

Therefore, when the projections to be detected by the cam sensor 250 are appropriately positioned, the cam sensor 250 may be provided in an arbitrary position. This allows the cylinder head 7S of the engine 7 to be designed with higher flexibility.

Note that without providing the projections 213*a*, 219*a*, 213*e*, and 211*a*, an arbitrary part of the weight 213 or 216, screws 219, or the like may directly be detected using the cam sensor 250. In this case, the weight 213 or 216, the screws 219, or the like is arranged or formed appropriately to allow the cam sensor 250 to carry out detection.

(12-2) In the above-described embodiments, the valve timing control device 200 described as the variable valve system switches the valve timing of the intake valve 334 and the exhaust valve 344 in response to changes in centrifugal force caused by the revolution of the engine 7, while the invention is not limited to the arrangement and is applicable to a variable valve system that switches the lift amount of the intake valve 334 or the exhaust valve 344 in response to changes in centrifugal force caused by the revolution of the engine 7.

(12-3) In the above-described embodiments, the valve timing control device 200 described as the variable valve system allows the weights 213 and 216 to pivot in response to changes in centrifugal force caused by the revolution of the engine 7, but the invention is not limited to the arrangement and is applicable to a variable valve system that allows the weights to linearly move in response to changes in the centrifugal force caused by the revolution of the engine 7.

(12-4) In the above-described embodiments, the width of the projection 213*a* of the weight 213 is set to be different from the width of the projection 219*a* of the screw 219, but the width of the projection 213*a* of the weight 213 may be equal to the width of the projection 219*a* of the screw 219.

In this case, the ECU 500 determines whether the number of pulses generated in the cam signal CA is one or two for one cycle of the engine 7. If the number of pulses generated in the cam signal CA for one cycle of the engine 7 is one, it is determined that the valve timing control device 200 is in the low revolution state, and if the number of pulses generated in the cam signal CA for one cycle of the engine 7 is two, it is determined that the valve timing control device 200 is in the high revolution state.

(12-5) In the above-described embodiments, after it is determined whether the valve timing control device 200 is in the low revolution state or the high revolution state, the ECU 500 calculates a fuel injection amount, fuel injection timing and spark ignition timing based on a throttle opening TR detected by the throttle valve sensor 270 and an engine revolution speed (FIG. 14), the fuel injection amount, the fuel injection timing and the spark ignition timing may be calculated based on other conditions. For example, the ECU 500 may calculate the fuel injection amount, the fuel injection timing, and the spark ignition timing based on one or more conditions among the throttle opening TR, the engine revolution speed, the oil temperature, the water temperature, the engine temperature, the kind of fuel and the like.

The present invention is applicable to various vehicles including an engine such as a motorcycle and a four-wheeled automobile and crafts including an engine.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A variable valve system that controls the opening/closing of a valve in response to the revolution speed of an engine, comprising:
    a rotation member provided to be rotatable in response to the revolution of said engine;
    a cam member provided in abutment against said valve and switchable between a first state in a first positional relation and a second state in a second positional relation relative to said rotation member;
    a moving member having a first detection portion and allowed to move by centrifugal force caused by the rotation of said rotation member so that said cam member is switched from said first state to said second state; and
    a detector provided to be capable of detecting said first detection portion rotating together with said rotation member when said moving member is in a first position corresponding to said first state or a second position corresponding to said second state.

2. The variable valve system according to claim 1, further comprising a second detection portion that rotates together with said rotation member, wherein
    said second detection portion is provided in such a position that said second detection portion is detected by said detector when rotating together with said rotation member.

3. The variable valve system according to claim 2, wherein said detector is provided in such a position that said detector can detect said first and second detection portions in a direction parallel to the rotation axis of said rotation member.

4. The variable valve system according to claim 2, wherein said detector is provided in such a position that said detector can detect said first and second detection portions in a direction orthogonal to the rotation axis of said rotation member.

5. The variable valve system according to claim 2, wherein the length of the first detection portion in the rotation direction and the length of said second detection portion in the rotation direction are different.

6. An engine system, comprising:
    an engine having a valve;
    a variable valve system that controls the opening/closing of said valve in response to the revolution speed of said engine; and
    a controller that controls said engine,
    said variable valve system including:
    a rotation member provided to be rotatable in response to the revolution of said engine;
    a cam member provided in abutment against said valve and switchable between a first state in a first positional relation and a second state in a second positional relation relative to said rotation member;
    a moving member having a first detection portion and allowed to move by centrifugal force caused by the rotation of said rotation member so that said cam member is switched from said first state to said second state; and
    a detector provided to be capable of detecting said first detection portion rotating together with said rotation member when said moving member is in a first position corresponding to said first state or a second position corresponding to said second state,
    said controller determining whether said cam member is in said first state or said second state based on the output signal of said detector and controlling the operation of said engine based on the result of determination.

7. The engine system according to claim 6, wherein said variable valve system further includes a second detection portion that rotates together with said rotation member, and
    said second detection portion is provided in such a position that said second detection portion is detected by said detector when rotating together with said rotation member.

8. The engine system according to claim 7, wherein the length of said first detection portion in the rotation direction and the length of the second detection portion in the rotation direction are different.

9. The engine system according to claim 8, wherein said controller determines whether or not said first detection portion is detected based on the detection period of said first or second detection portion by said detector.

10. The engine system according to claim 7, wherein said controller determines whether or not said first detection portion is detected based on the number of detection by said detector for one rotation period of said rotation member.

11. The engine system according to claim 6, wherein said controller determines whether said cam member is in said first state or said second state based on the output signal of said detector and controls at least one of a fuel injection amount, fuel injection timing, and spark ignition timing in said engine based on the result of determination.

12. A vehicle, comprising;
    an engine system; and
    a driving member driven by motive power generated by said engine system,
    said engine system including:
    an engine having a valve;
    a variable valve system that controls the opening/closing of said valve in response to the revolution speed of said engine; and
    a controller that controls said engine,
    said variable valve system including:
    a rotation member provided to be rotatable in response to the revolution of said engine;
    a cam member provided in abutment against said valve and switchable between a first state in a first positional relation and a second state in a second positional relation relative to said rotation member;
    a moving member having a first detection portion and allowed to move by centrifugal force caused by the rotation of said rotation member so that said cam member is switched from said first state to said second state; and
    a detector provided to be capable of detecting said first detection portion rotating together with said rotation member when said moving member is in a first position corresponding to said first state or a second position corresponding to said second state,
    said controller determining whether said cam member is in said first state or said second state based on the output signal of said detector and controlling the operation of said engine based on the result of determination.

* * * * *